United States Patent
Suekane et al.

(10) Patent No.: US 7,271,838 B2
(45) Date of Patent: Sep. 18, 2007

(54) IMAGE PICKUP APPARATUS WITH BRIGHTNESS DISTRIBUTION CHART DISPLAY CAPABILITY

(75) Inventors: Hisashi Suekane, Tokyo (JP); Hiroyuki Watanabe, Kanagawa (JP); Masami Totsuka, Tokyo (JP); Takashi Fujii, Saitama (JP); Akira Yukitake, Tokyo (JP); Koh Yokokawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 866 days.

(21) Appl. No.: 10/426,186

(22) Filed: Apr. 30, 2003

(65) Prior Publication Data

US 2004/0042791 A1 Mar. 4, 2004

(30) Foreign Application Priority Data

| May 8, 2002 | (JP) | ............................ 2002-133266 |
| May 8, 2002 | (JP) | ............................ 2002-133269 |
| May 8, 2002 | (JP) | ............................ 2002-133271 |

(51) Int. Cl.
*H04N 5/222* (2006.01)
(52) U.S. Cl. .................... 348/333.02; 348/222.1; 348/234
(58) Field of Classification Search ........... 348/333.01, 348/333.02, 229.1, 221.1, 234
See application file for complete search history.

(56) References Cited

U.S. PATENT DOCUMENTS

| 4,182,573 | A | * | 1/1980 | Yamada et al. ............. 356/218 |
| 4,671,655 | A | * | 6/1987 | Heard ........................ 356/227 |
| 7,084,917 | B2 | * | 8/2006 | Matsushima ........... 348/333.02 |
| 2002/0171747 | A1 | * | 11/2002 | Niikawa et al. ....... 348/333.01 |

FOREIGN PATENT DOCUMENTS

| JP | A654830 | 3/1994 |
| JP | A6282004 | 10/1994 |
| JP | A6311517 | 11/1994 |
| JP | A738801 | 2/1995 |
| JP | A2001245204 | 9/2001 |
| JP | A20038986 | 1/2003 |

\* cited by examiner

*Primary Examiner*—Vivek Srivastava
*Assistant Examiner*—Gevell Selby
(74) *Attorney, Agent, or Firm*—Volpe & Koenig PC

(57) ABSTRACT

An image pickup apparatus includes an image pickup unit for outputting an electronic subject image, a metering unit for computing a metering value from the subject image, a brightness distribution chart generation unit for generating a brightness distribution chart from the subject image, and a display unit for overlaying the brightness distribution chart on the subject image and displaying them, and provides the brightness distribution chart for the display unit in various styles.

16 Claims, 29 Drawing Sheets

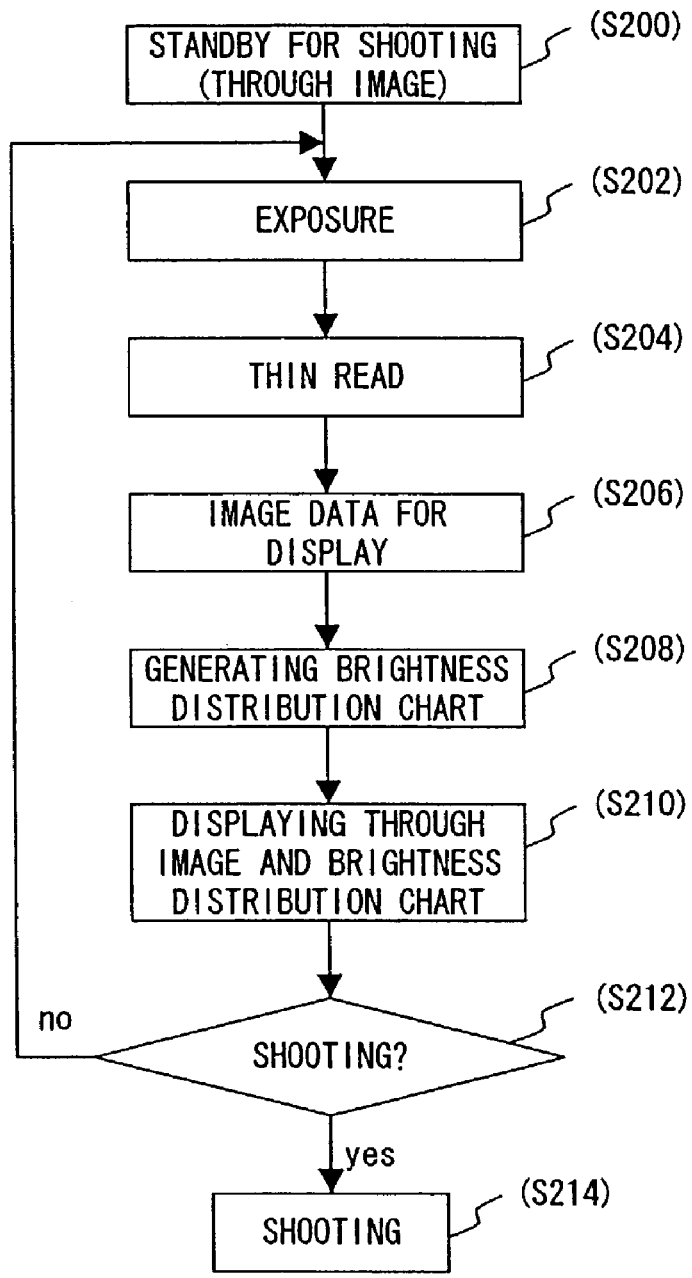
F I G. 2

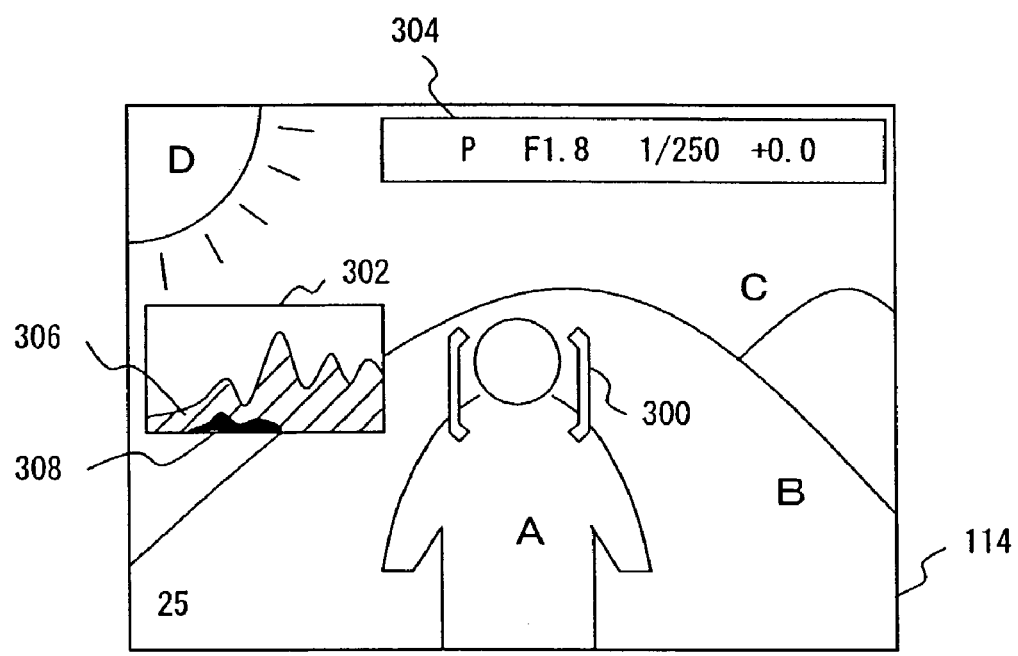
F I G. 3

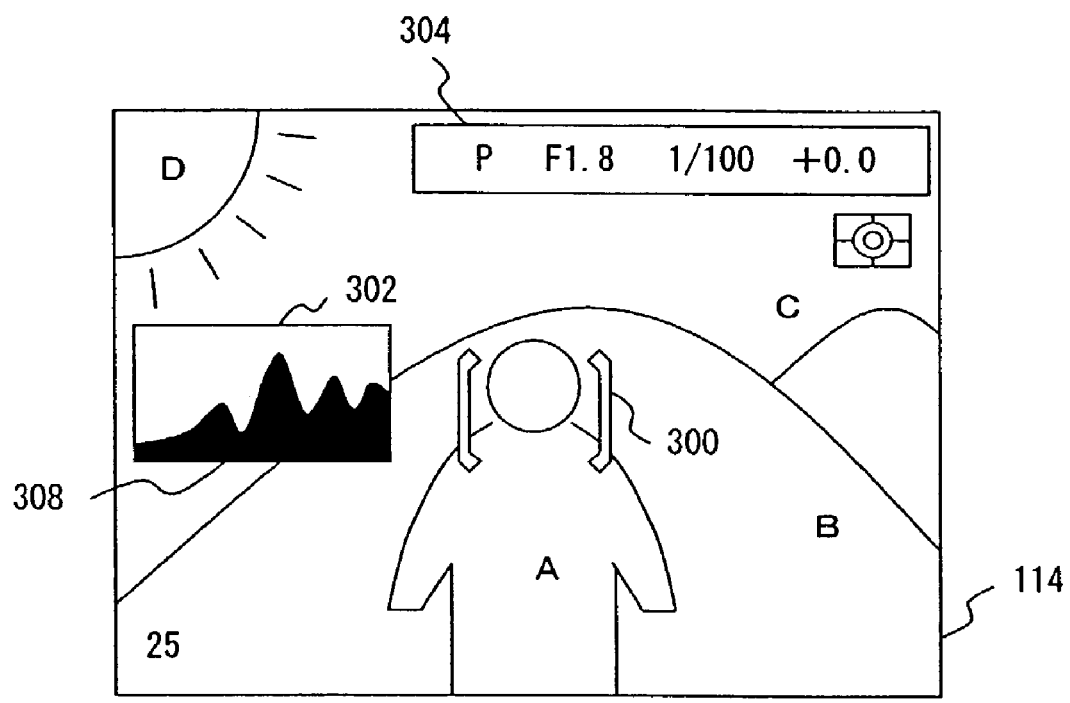
F I G. 5

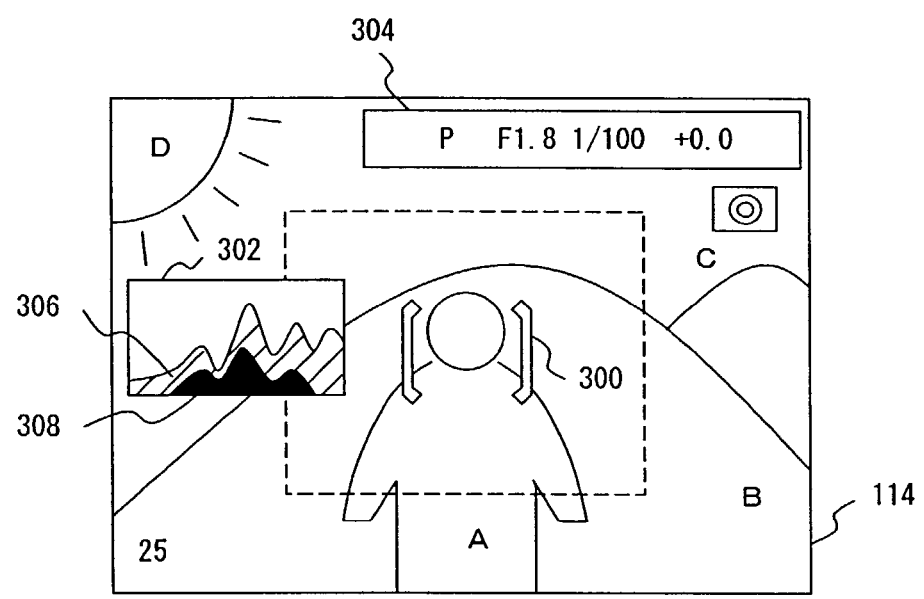
F I G. 6

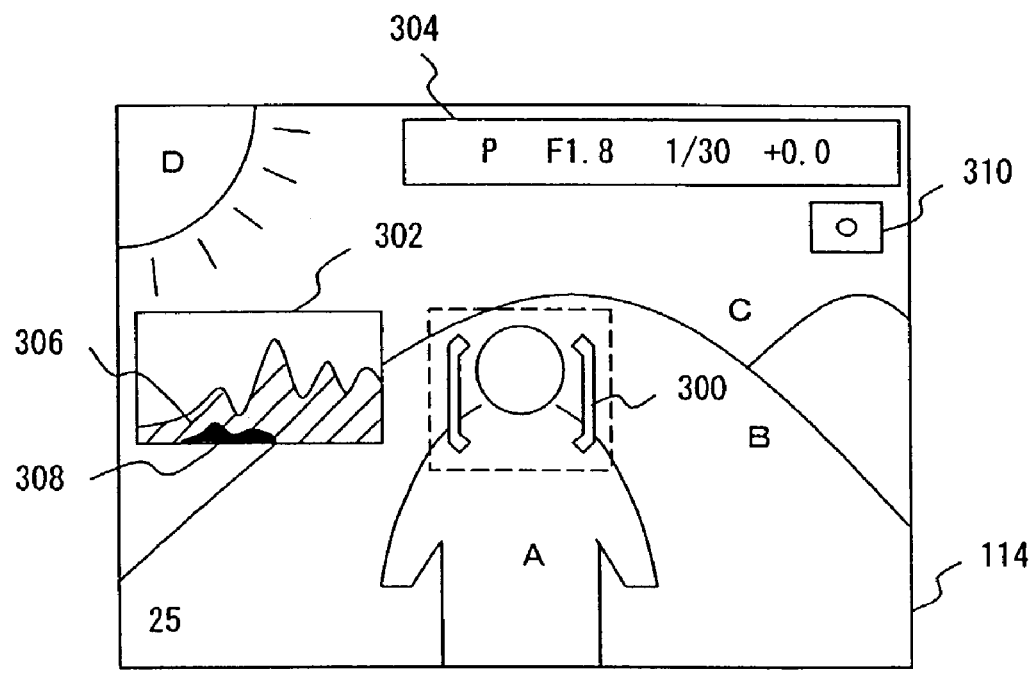
F I G. 7

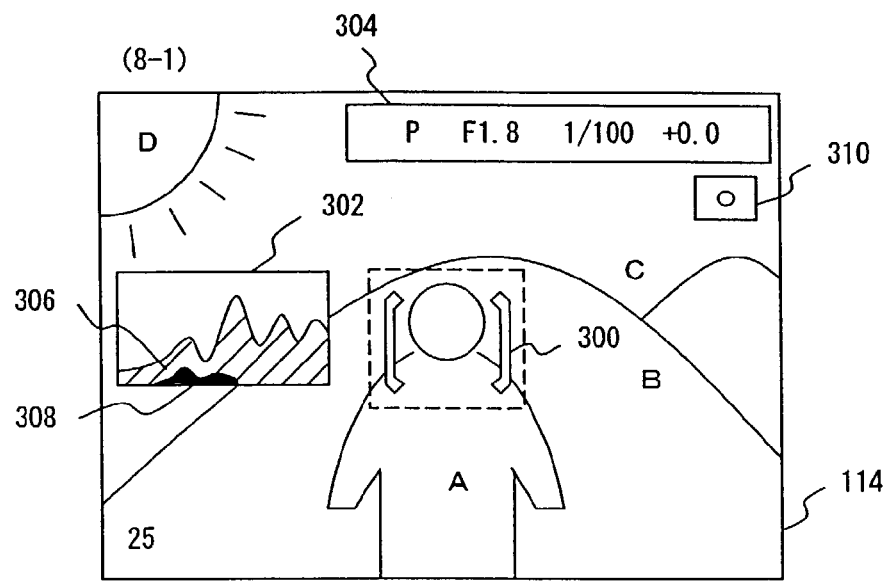
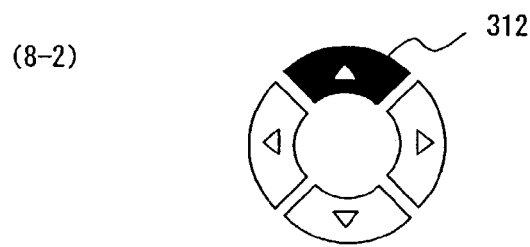
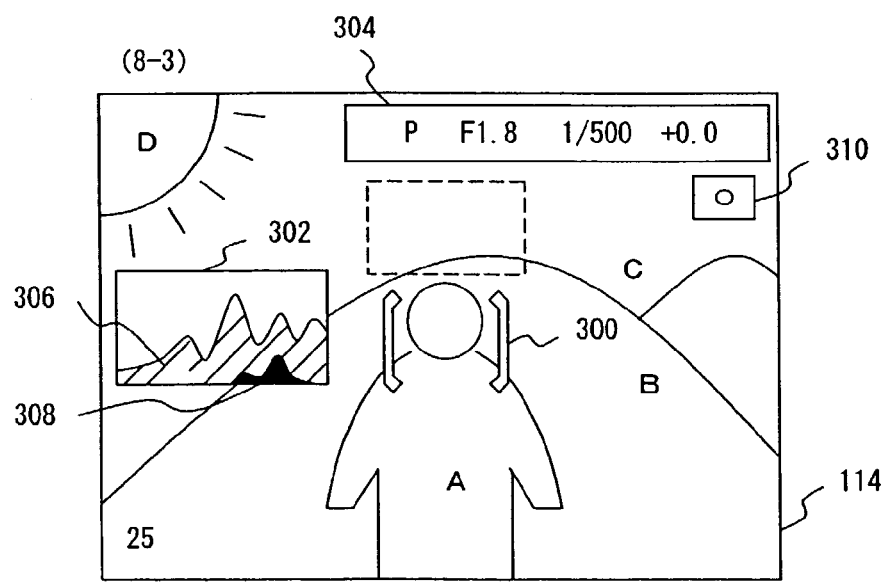
FIG. 8

(12-1)
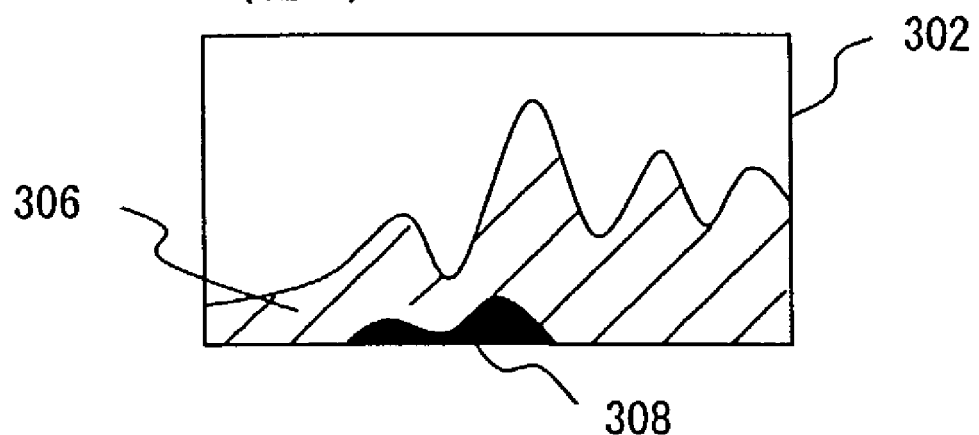
(12-2)
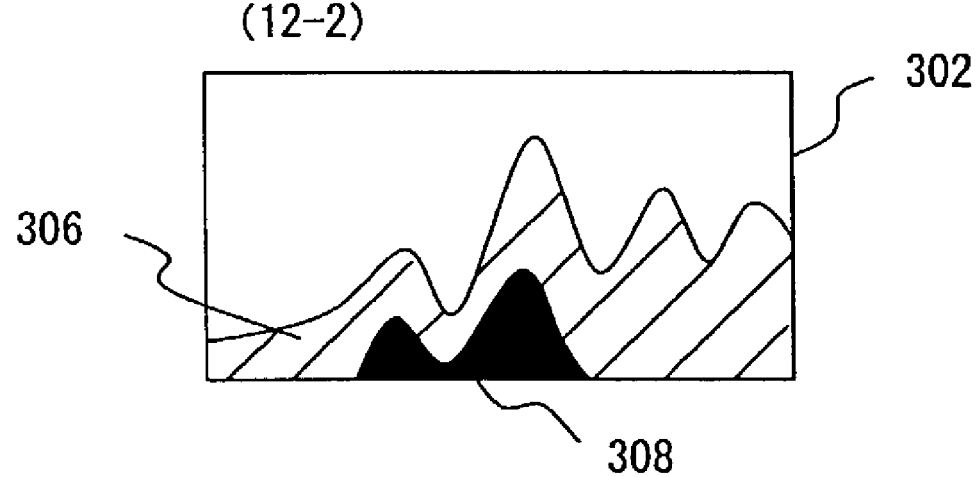
FIG. 12

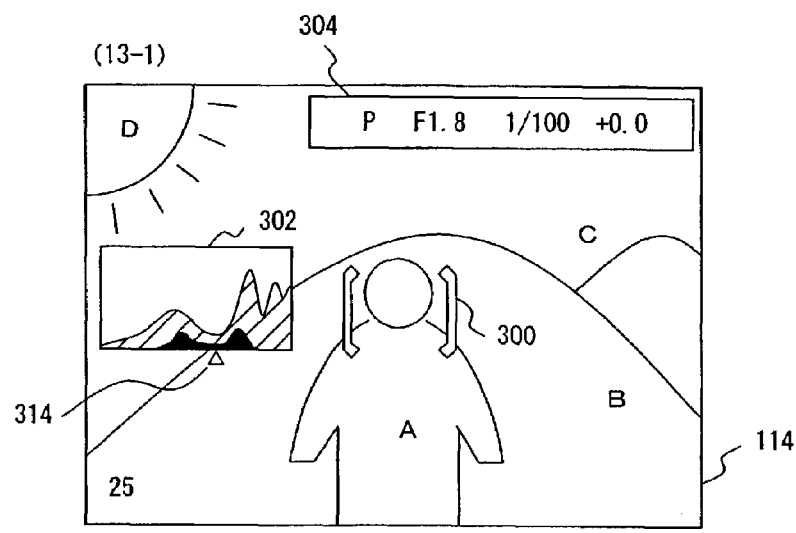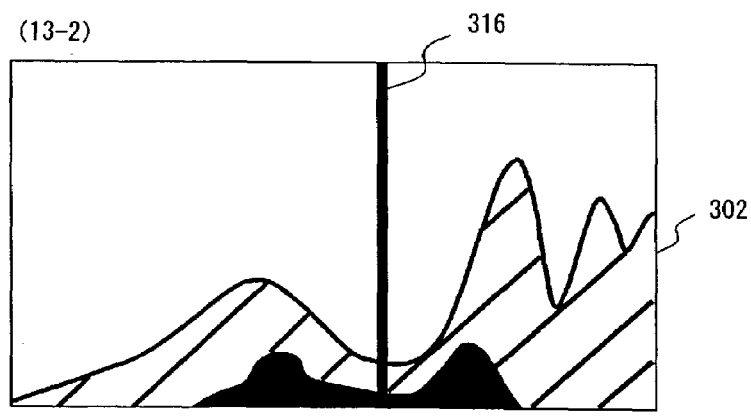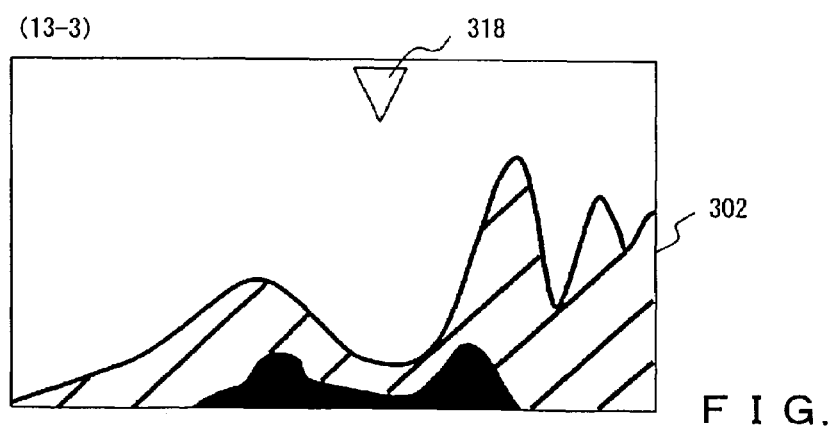
FIG. 13

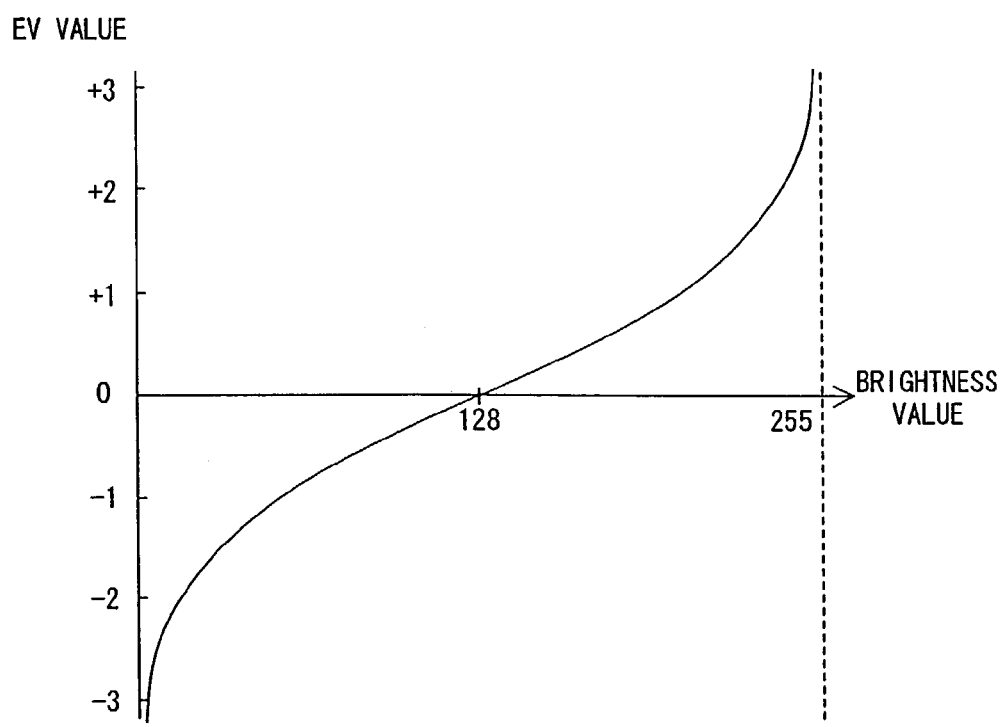
F I G. 1 6

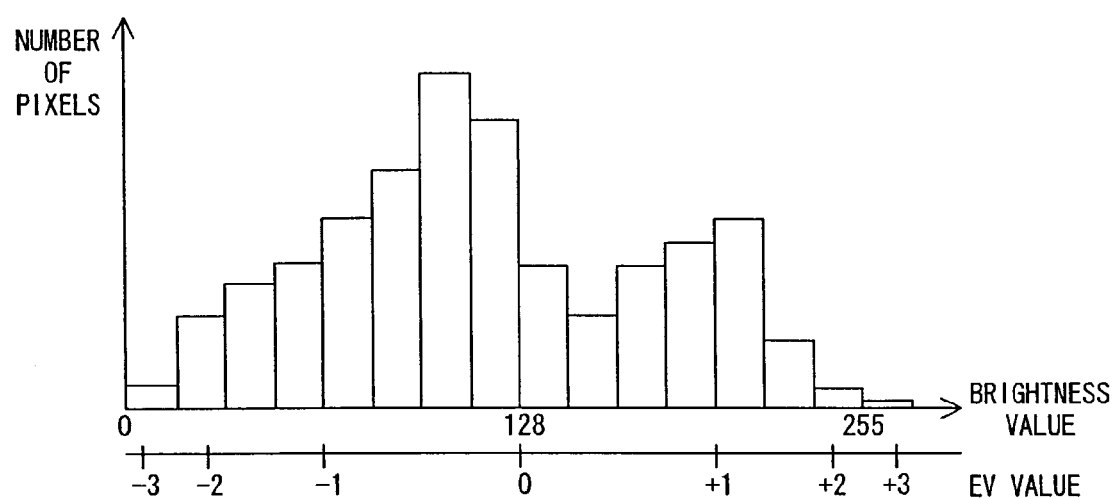
F I G. 1 7

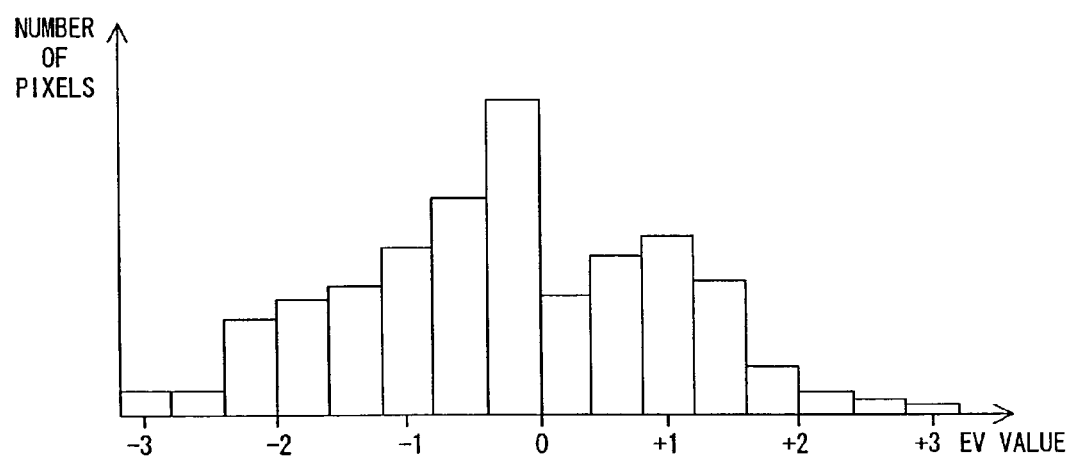
F I G. 19

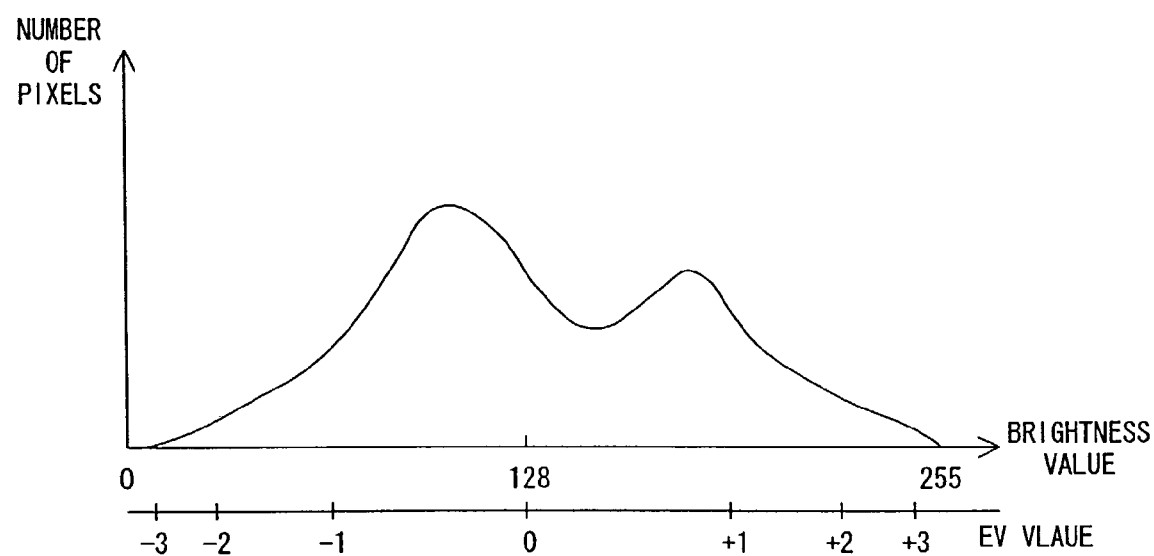
F I G. 2 0

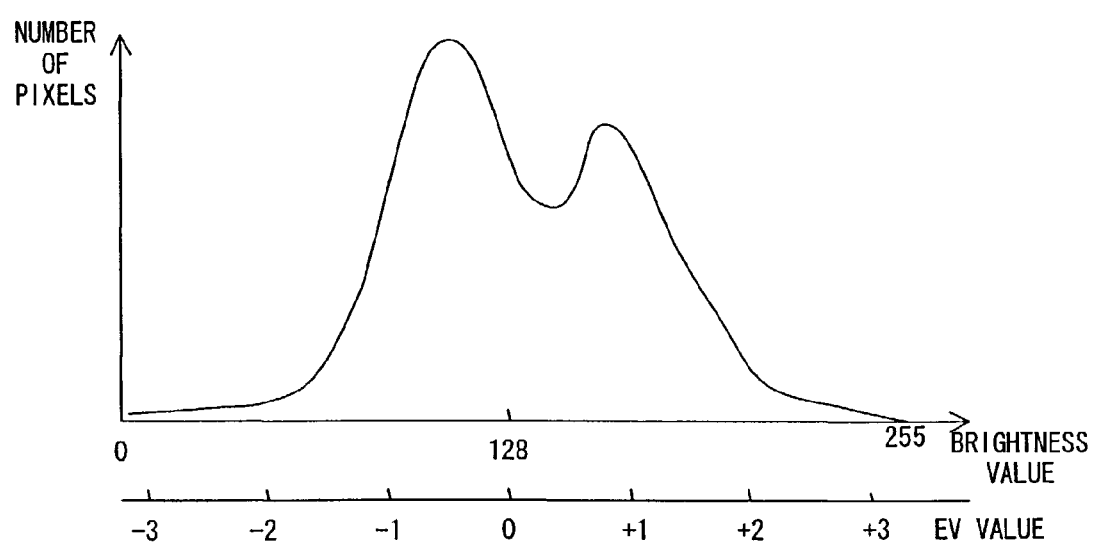
F I G. 2 1

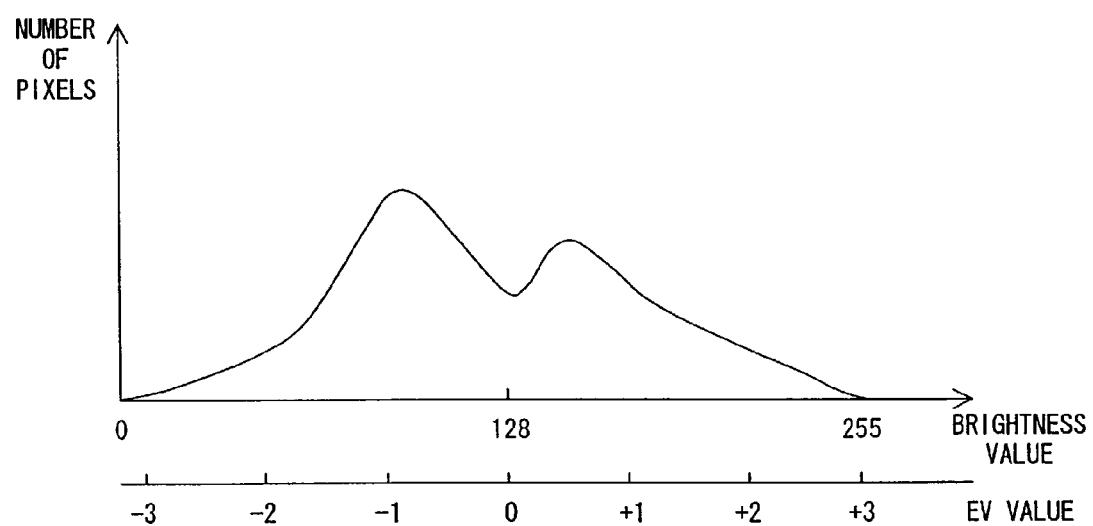
F I G. 2 2

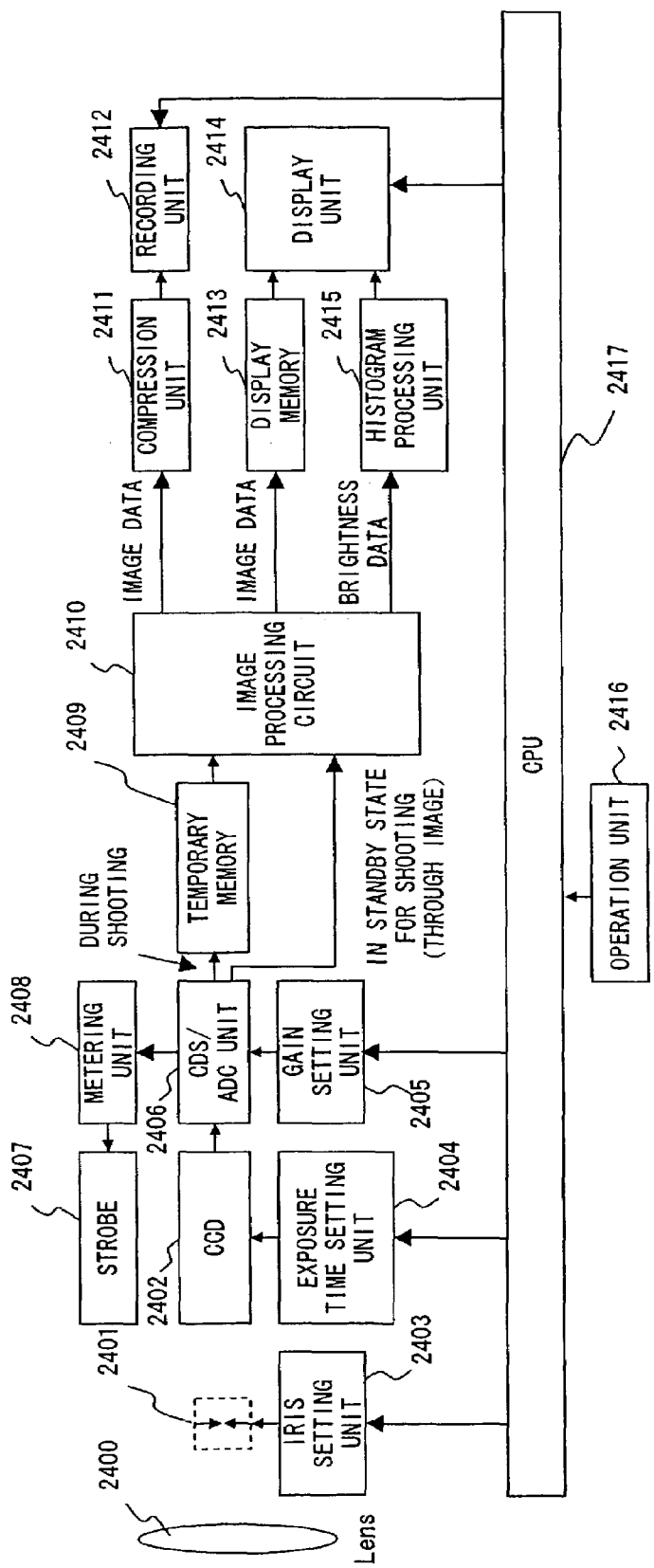
F I G. 24

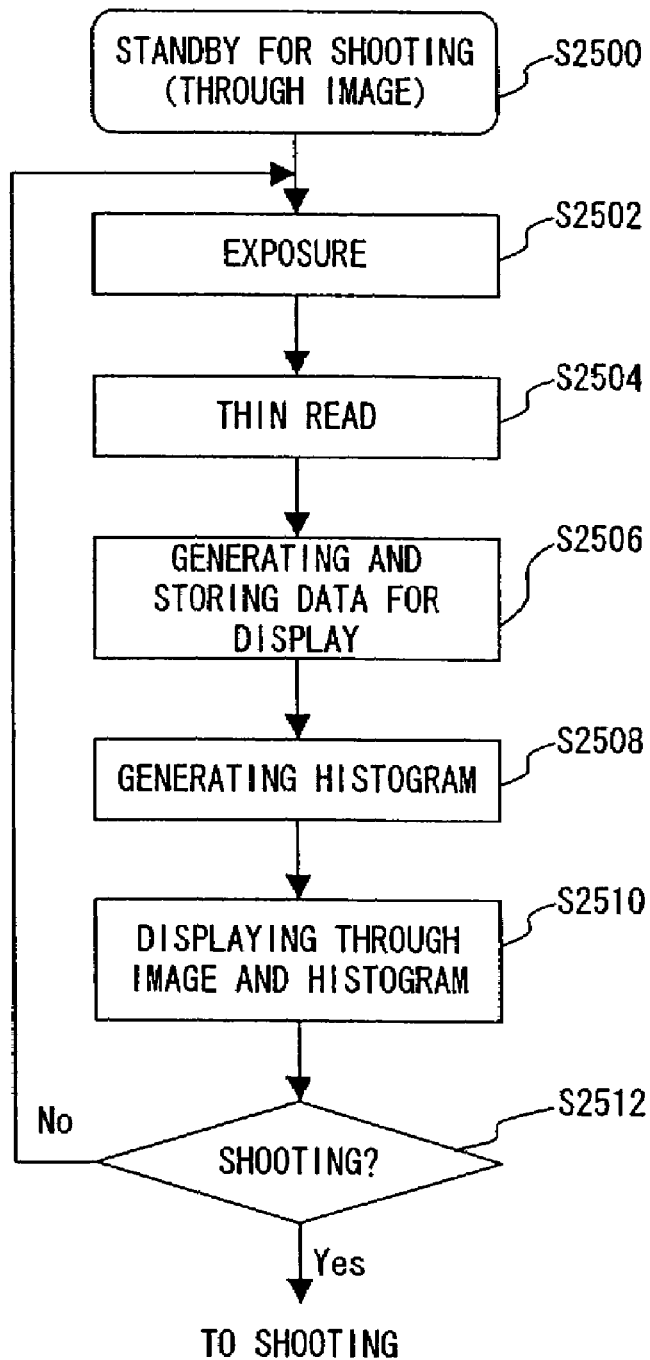
F I G. 2 5

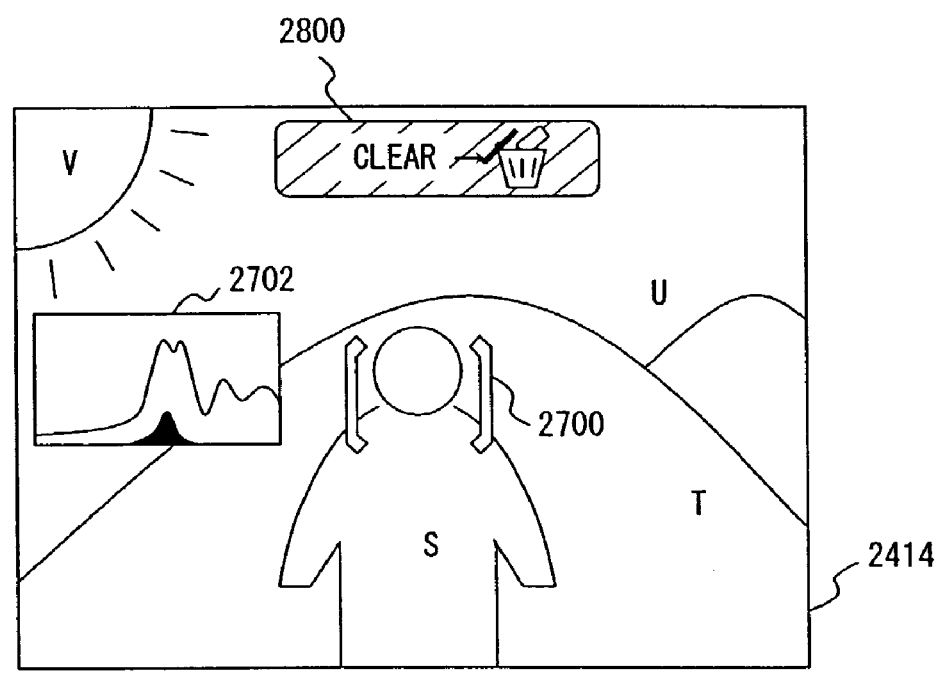
F I G. 2 8

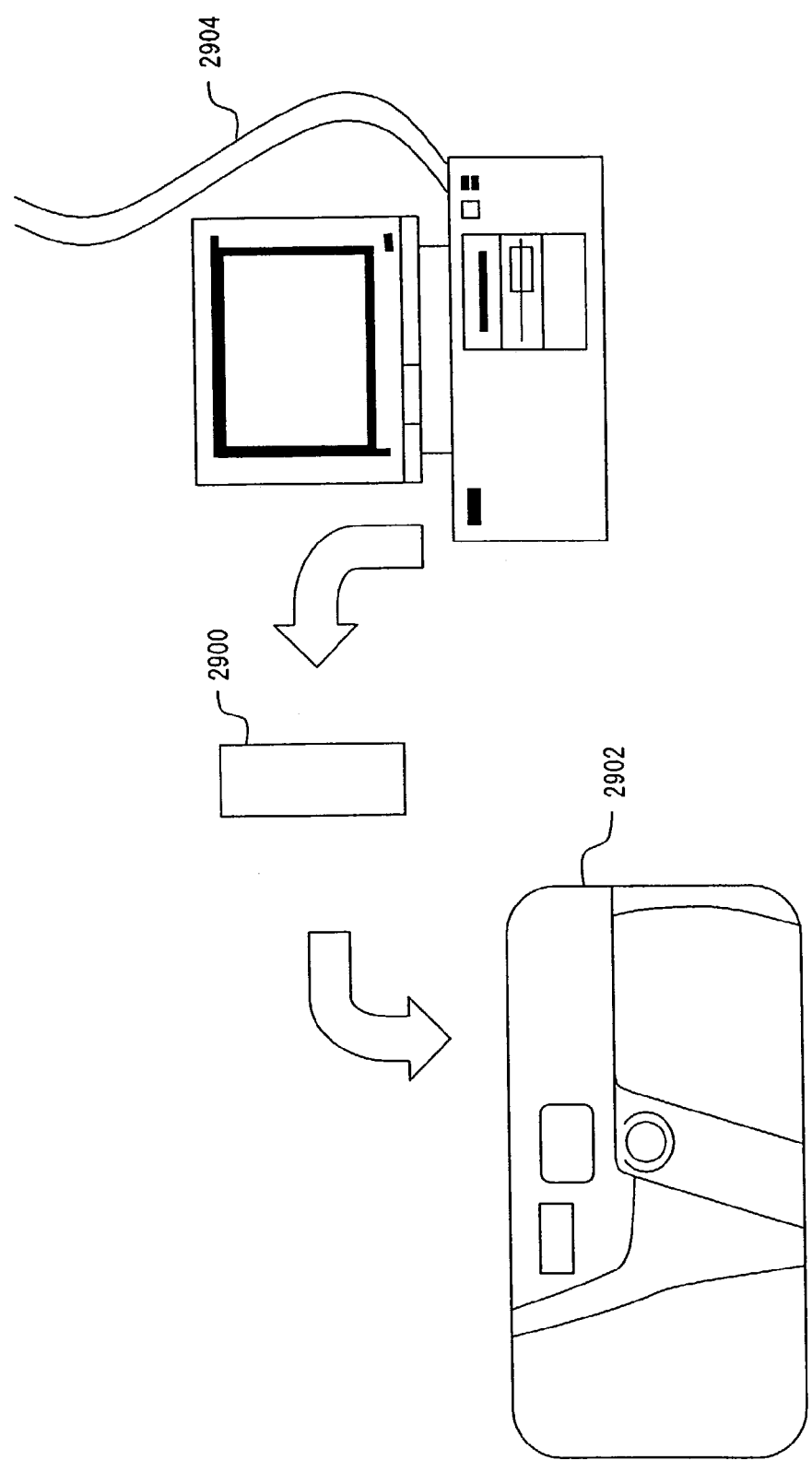

IMAGE PICKUP APPARATUS WITH BRIGHTNESS DISTRIBUTION CHART DISPLAY CAPABILITY

BACKGROUND OF THE INVENTION

1. Field of the Invention

The present invention relates to a brightness distribution display technology of an image pickup apparatus for displaying on the display screen the brightness distribution of an electronically retrieved subject image.

2. Description of the Related Art

A digital camera has conventionally been well known as one of the image pickup apparatuses for electrically retrieving a subject image (also referred to as a shot image), and recording the retrieved image as digital data on a storage medium such as Compact Flash (registered trademark), Smart Media (registered trademark), etc.

The digital camera electrically retrieves a subject image through an image pickup device such as a CCD (charge coupled device), etc., performs digitization on the retrieved image, and displays a digital image of the subject on the display screen (display unit) of, for example, liquid crystal, etc. configured in the body of the camera. These operations are constantly performed not only when a shutter button is pressed for shooting a subject image, but also when the shooting mode of the digital camera is in the standby state for shooting (the state in which the shutter button is ready for pressing). In the standby state for shooting, a thin image (through image) of a subject image sequentially retrieved from the image pickup device can be displayed on the display unit. The photographer can always view the subject image on the display unit although the digital camera is in the standby state for shooting.

When a subject is shot using the above-mentioned digital camera, it is necessary as in the case of shooting a subject using a conventional photographic film camera to set various conditions by determining the angle of view, performing focusing, determining the exposure condition by adjusting the iris and the shutter speed, etc.

The above-mentioned determination of the exposure condition in the condition settings can be performed by the digital camera normally using the metering unit performing metering of a specific range within the angle of view, and the iris and the shutter speed can be adjusted based on the metering result. The adjustment in the digital camera, for example, during shooting, is performed by computing the brightness value of a subject according to the shooting signal in the specific range retrieved from the CCD before shooting, and setting the value as a metering value by the metering unit. Based on the diagram of the program showing the relationship among the metering value, the shutter speed, etc., the conditions of the iris and the shutter speed for the metering value in the specific range metered by the metering unit are computed, and the adjustment of the iris and the shutter speed is automatically performed to satisfy the conditions. The specific range can be varied. The specific range can be narrowed to perform spot metering for metering on a point, the metering value computed from the brightness value in each range is held by metering a plurality of ranges within the angle of view, and multi-metering can be performed based on the average of the held metering values.

Thus, the digital camera is constantly adjusted to obtain correct exposure of a shot image when an image is shot.

However, correct exposure may not be obtained during shooting in an unexpected shooting environment, or it may be difficult to obtain correct exposure based on the likings of all photographers eventhough the shooting environment is acceptable.

Therefore, with the above-mentioned digital camera, it is common that a photographer can adjust the exposure condition by himself or herself.

To allow the photographer to adjust the exposure condition by himself or herself, the Patent Publication (Japanese Patent Application Laid-open No. 2001-245204) discloses the following technology.

In the disclosed technology, to appropriately adjust the exposure condition of the shot image displayed on the display screen, the Patent Publication discloses an example of computing the brightness value of each pixel of the shot image displayed on the display screen, obtaining a statistic (count value) of the number of pixels for each computed brightness value, and overlaying the brightness distribution chart obtained as the statistical result on the shot image on the display screen, and displaying the overlaid image, and an example of displaying a colored brightness distribution chart by coloring and displaying the brightness distribution chart depending on the brightness value, coloring the brightness distribution chart when the adjustment of the exposure condition by the photographer reaches the limit, etc. Using the brightness distribution chart, the balance of the brightness value can be recognized at a glance eventhough the entire shot image is too bright or too dark. Therefore, the photographer can appropriately adjust the exposure condition.

Normally, the latitude (also referred to as a dynamic range) of a shot image is narrower in the digital camera than in the conventional photographic film camera. Therefore, if a subject is shot under the exposure condition based on the metering result in a specific range, there occurs a white spot or blacking on a generated subject image depending on the shooting environment.

The digital camera normally defaults to the metering, centering on the center of the subject, and when the subject is shot, an exposure condition is set such that correct exposure can be applied to the shooting range (autoexposure capability). Therefore, for example, during shooting in back-lit conditions, only the center of the subject is dark and the surrounding portions are bright in the sunshine. As a result, if the metering is performed at the center of the above-mentioned subject, the brightness distribution chart shows a bias toward higher brightness values entirely, and the chart shows an overexposure state.

Thus, for a brightness distribution chart for the balanced brightness value of the entire subject image, the purpose of the autoexposure capability (AE for short) is not the value of the entire subject image, but the correct exposure of a predetermined area. Therefore, although the correct exposure can be obtained by the above-mentioned AE, it is natural that the impression from the brightness distribution chart is quite different.

The conventional technology has never indicated the relationship between the brightness distribution in a predetermined range of a subject image such as a range specified by the AE, etc. and the brightness distribution chart.

Furthermore, a digital camera can indicate a difference between a shot image actually shot by adjusting the exposure condition and a subject image displayed on the display unit before the shooting. The difference comes from the differences in various setting conditions between the standby state for shooting and the shooting. The practical differences in the setting conditions are those in the iris settings before and during shooting when a there is a flash working on the subject only when the subject is shot and when a moving subject is shot, or the exposure condition settings before and during shooting when there are different shooting environments before and after the shooting of a moving subject.

Therefore, there are a few objects to be deleted from shot images.

The digital camera has the function of reviewing a shot image on the display screen immediately after the shooting. With the function, the display time depends on the amount of data of the shot image, and a shot image of a small amount of data is displayed on the display screen only for a short time.

In the conventional technology, a digital camera has no function of checking the details of a shot image.

SUMMARY OF THE INVENTION

The first object of the present invention is to provide a photographer with the technology to correctly adjust the exposure condition by clarifying the relationship between the brightness distribution of the entire subject image and that of a predetermined range of the subject image. According to an aspect of the first object of the present invention, an image pickup apparatus includes: an image pickup unit for outputting an electronic subject image; a display unit for displaying the subject image; an entire chart generation unit for generating an entire brightness distribution chart which shows the brightness distribution of the entire range of the subject image; a partial chart generation unit for generating a partial brightness distribution chart which shows the brightness distribution of a partial range of the subject image; and a control unit for simultaneously controlling the entire brightness distribution chart and the partial brightness distribution chart on the display unit.

The second object of the present invention is to provide a photographer with the technology to correctly adjust the exposure condition by effectively utilizing the features of a brightness distribution chart and a metering value. According to an aspect of the second object of the present invention, an image pickup apparatus includes: an image pickup unit for outputting an electronic shot image; a metering unit for computing a metering value from the shot image; a brightness distribution chart generation unit for generating a distribution chart of brightness values from the shot image; and a display unit for displaying the brightness distribution chart. The display unit displays a metering value near the brightness value corresponding to the metering value of the brightness distribution chart.

The third object of the present invention is to provide a photographer with the technology to check in detail a shot image immediately after the shooting. According to an aspect of the third object of the present invention, an image pickup apparatus includes: an image pickup unit for outputting image data for recording or image data for a through image; a brightness distribution chart generation unit for generating a brightness distribution chart based on the output image data; and a shot image check unit for displaying an image based on the output image data and the brightness distribution chart on a display unit. The shot image check unit displays immediately after shooting a brightness distribution chart generated based on the image data for recording together with an image based on the image data for recording.

BRIEF DESCRIPTION OF THE DRAWINGS

FIG. 2 shows an example of an operation flow in a standby state for shooting of the digital camera shown in FIG. 1;

FIG. 3 shows an example of the case in which the brightness distribution enclosed by the target marks is displayed on the display screen of the digital camera shown in FIG. 1;

FIG. 5 shows an example of the case in which the metering area of average metering is defined as a specified area;

FIG. 6 shows an example of the case in which the metering area of the centerweighted metering is defined as a specified area;

FIG. 7 shows an example of the case in which the metering area of the spot metering is defined as a specified area;

FIG. 8 shows an example of the case in which a metering cursor is moved by an instruction of an operation button;

FIG. 12 shows an example of an expanded display of a predetermined brightness distribution;

FIG. 13 shows an example of the case in which an indication mark of the average brightness of a brightness distribution is displayed;

FIG. 16 is a graph showing an example of the relationship between a brightness value and an EV value;

FIG. 17 shows an example of displaying a brightness distribution chart in which a brightness value is quantized for display as a reference axis together with a multi-metering bar;

FIG. 19 shows scales in equal increments of brightness values in the brightness distribution chart shown in FIG. 18;

FIG. 20 shows an example of displaying a brightness distribution chart in which a brightness value is continuously displayed as a reference axis together with a multi-metering bar;

FIG. 21 shows an example of a brightness distribution chart in which the scale of brightness values shown in FIG. 20 is changed based on the graph shown in FIG. 16;

FIG. 22 shows an example of the case in which the shape of the brightness distribution chart shown in FIG. 21 is approximate to the shape of the brightness distribution chart shown in FIG. 20;

FIG. 24 is a block diagram of a digital camera of an embodiment according to the third aspect of the present invention;

FIG. 25 shows an example of an operation flow in the standby state for shooting by the digital camera shown in FIG. 24;

FIG. 26 shows an example of an operation flow at the shooting stage by the digital camera shown in FIG. 24 when the brightness distribution chart display is turned on;

FIG. 28 shows an example of displaying recording image data displayed on the digital camera shown in FIG. 24 during shooting; and FIG. 29 shows a mode of providing a program incorporated into a digital camera of an embodiment according to the first through third aspects of the present invention.

DESCRIPTION OF THE PREFERRED EMBODIMENTS

Figure 1:
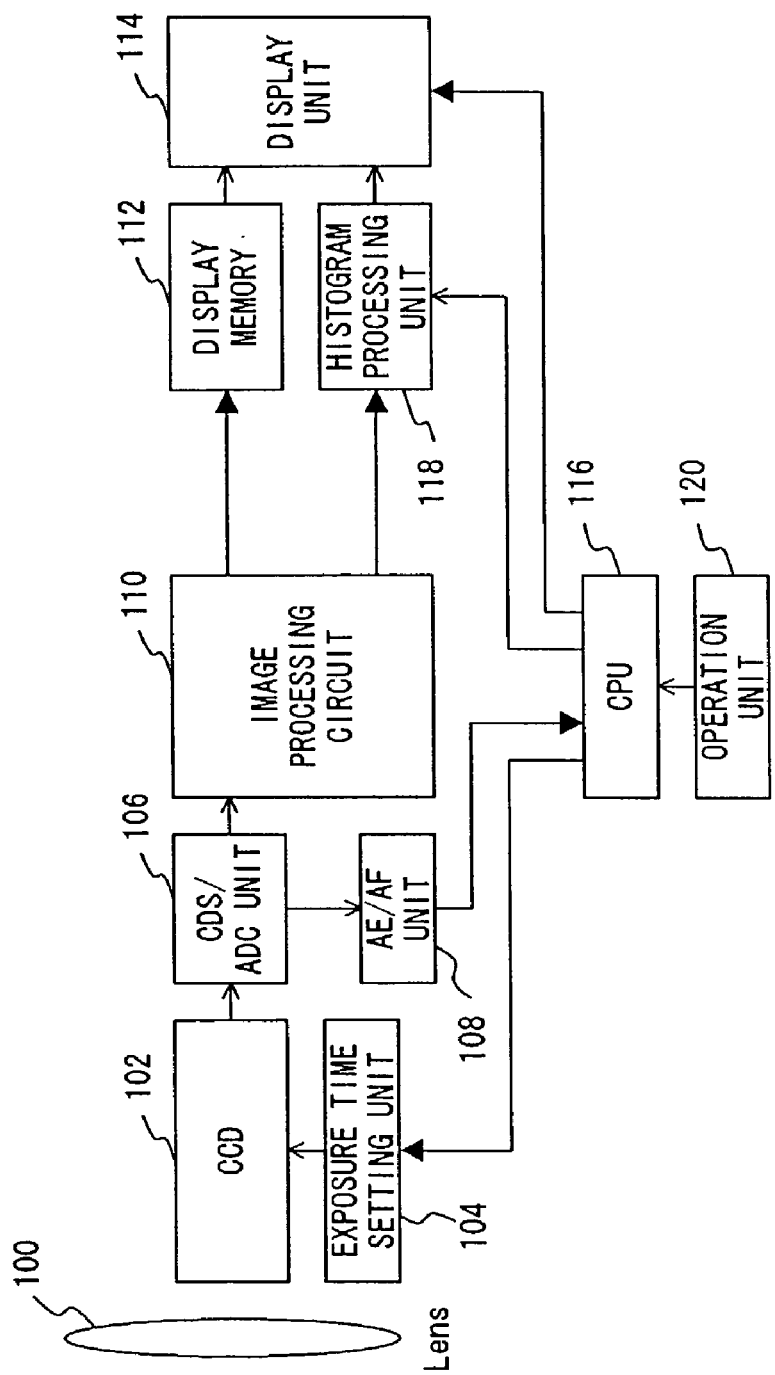
FIG. 1 is a block diagram of a digital camera of an embodiment of the first aspect of the present invention.

One of the first aspects of the present invention is configured to comprise an image pickup unit for outputting an electronic subject image; a display unit for displaying the subject image; an entire chart generation unit for generating an entire brightness distribution chart which shows the brightness distribution of the entire range of the subject image; a partial chart generation unit for generating a partial brightness distribution chart which shows the brightness distribution of a partial range of the subject image; and a control unit for simultaneously controlling the entire brightness distribution chart and the partial brightness distribution chart on the display unit.

With the above-mentioned configuration, both the entire brightness distribution chart and the partial brightness distribution chart are displayed on the display unit. Therefore, the relationship between the two brightness distributions can be clarified.

The above-mentioned control unit can also display on the display unit by overlaying the partial brightness distribution chart in the corresponding position of the entire brightness distribution chart.

With the above-mentioned configuration, the correspondence between the above-mentioned two brightness distribution charts can be effectively displayed in a small space.

Furthermore, the partial chart generation unit can also be configured to generate a partial brightness distribution chart based on the metering range for determination of an exposure condition specified by the subject image displayed on the display unit.

With the above-mentioned configuration, the brightness distribution in a metering range is a target partial brightness distribution chart.

A change unit for changing the above-mentioned metering range can be further provided to allow the partial chart generation unit to generate the partial brightness distribution chart depending on the metering range after the change.

With the configuration, the brightness distribution in the changed metering range is a target partial brightness distribution chart according to the change in the metering range.

Furthermore, the partial chart generation unit can also be configured to generate partial brightness distribution chart depending on the focusing range for focusing.

With the above-mentioned configuration, the brightness distribution in the focusing range can be a target partial brightness distribution chart.

Furthermore, a partial range setting unit for setting the above-mentioned partial range which is a generation range of the partial brightness distribution chart can be further included.

With the above-mentioned configuration, setting the above-mentioned partial range can be performed by other exclusive partial range setting units.

The partial chart generation unit generates a brightness distribution chart for each of the plurality of partial ranges, and the control unit can be configured such that the above-mentioned plurality of brightness distributions can be identified and displayed on the display unit.

With the above-mentioned configuration, the relationship between the entire brightness distribution chart and the plurality of partial brightness distribution charts can be clarified.

Furthermore, the control unit can be configured to display the entire brightness distribution chart and the partial brightness distribution chart in the same scale relating to the axis of the brightness value which is one axis of the brightness distribution chart (entire brightness distribution chart and partial brightness distribution chart), and display the partial brightness distribution chart as larger than the entire brightness distribution chart relating to the axis of the occurrence frequency which is the other axis.

With this configuration, the partial brightness distribution chart can be clearly determined from the entire brightness distribution chart.

Additionally, the control unit can also be configured such that a predetermined display can be performed in a position corresponding to the average brightness in a partial range of the subject image as a generation target of the partial brightness distribution chart within or near the partial brightness distribution chart.

With this configuration, the average brightness value can be easily determined in a distributed partial brightness distribution chart.

Another first aspect of the present invention is a method for generating an entire brightness distribution chart which shows a brightness distribution about the entire range of the electronically shot subject image and a partial brightness distribution chart which shows a brightness distribution of a partial range of the subject image, and displaying the two brightness distribution charts on the display unit with the partial brightness distribution chart overlaid in the corresponding position of the entire brightness distribution chart.

In the above-mentioned method, both the entire brightness distribution chart and the partial brightness distribution chart can be overlapped and displayed on the display unit. Therefore, the relationship between the two brightness distributions can be clearly indicated.

A further first aspect of the present invention is a control program used to direct a computer to perform: an entire chart generating step of generating an entire brightness distribution chart which indicates a brightness distribution of the entire range of an electronically shot subject image; a partial chart generating step of generating a partial brightness distribution chart which indicates a brightness distribution of a partial range of the subject image; and a control step of overlapping the partial brightness distribution chart in the corresponding position of the entire brightness distribution chart, and displaying the two brightness distribution charts on the display unit.

When the control program is executed on the computer, both the entire brightness distribution chart and the partial brightness distribution chart can be displayed on the display unit. Therefore, the relationship between the above-mentioned two brightness distributions can be clarified.

The embodiment of the first aspect of the present invention is described below in detail by referring to the attached drawings.

FIG. 1 is a block diagram of a digital camera of an embodiment of the first aspect of the present invention.

A lens 100 is configured by an optical lens. A CCD 102 is configured as an image pickup device on the optical axis of the lens, and the exposure time of the CCD 102 is adjusted based on the settings of an exposure time setting unit 104.

The subject image input through the lens 100 is converted into an electric signal by the CCD 102, a gain adjustment and a noise removing process are performed on the subject image by a CDS/ADC unit 106, and the image is converted into digital data.

The digital data is output to an AE/AF unit 108, and the AE/AF unit 108 performs exposure (AE) setting and focus (AF) detection based on the digital data.

In the AE setting, data in a predetermined metering range is extracted from the digital data, and the brightness of the subject is metered based on the brightness of the extracted data, and the exposure is determined based on the metering range obtained by the metering.

In the AF detection, the position in which the highest contrast of the brightness data can be obtained is detected by extracting the brightness data in the focusing area from the digital data.

The digital data output from the CDS/ADC unit 106 is processed by an image processing circuit 110 in a color signal process, a resizing process, a γ converting process, etc., and the image data for display output as a result is stored in display memory 112, and displayed on a display unit 114 such as the display unit of an LCD monitor, etc.

A CPU (central processing unit) 116 controls the exposure time setting unit 104 according to the exposure set by the AE/AF unit 108, controls the display unit 114, or controls a histogram processing unit 118 for generating a brightness distribution chart indicating the distribution of the brightness value based on the brightness data of each pixel of the image data for display generated by the image processing circuit 110, and computing an average brightness value from the brightness data as necessary.

The CPU 116 corrects and sets the exposure time setting unit 104 to the exposure time set by the AE/AF unit 108 when an exposure correcting operation is performed by an operation unit 120.

Upon receipt of an operation instruction from the operation unit 120 to display the brightness distribution chart on the display unit 114, the CPU 116 allows the histogram processing unit 118 to perform on the brightness distribution chart a process of, for example, coloring the area set by default or the area specified in the display unit 114 to be distinguished from other areas. Then, a process of overlapping and displaying the color generated in the above-mentioned process on the image data for display displayed on the display unit 114, etc. is performed.

Furthermore, when an operation of a cross button, etc. is performed by the operation unit 120, the CPU 116 allows the display unit 114 to display predetermined information, moves target marks and various cursors displayed on the display unit 114, etc.

FIG. 2 shows an example of an operation flow in a standby state for shooting of the digital camera with the above-mentioned configuration.

In the standby state for shooting in which the through image of a subject is displayed on the display unit 114 of a digital camera (S200), the CCD 102 performs exposures according to the exposure time set by the exposure time setting unit 104 based on the exposure set by the AE/AF unit 108 or the corrected exposure when an exposure correcting operation is performed (S202). Upon completion of the exposures, an image signal is thinly read from the CCD 102 (S204). The thin read is performed because smooth-motion through images can be displayed on the display unit 114 in reading signals within a shorter time than by the CCD 102 reading all images, and in displaying the thin images with the quality of images maintained and a smaller number of pixels to be displayed on the display unit 114 than the total number of pixels of the CCD 102. The thinly read image signal is processed by the CDS/ADC unit 106 in a predetermined gain adjustment and noise removing process, and is furthermore processed by the image processing circuit 110 in the color signal process, the γ converting process, the resizing process for display, etc. The image data output from the image processing circuit 110 is stored in the display memory 112 as image data for display (S206). The image data for display output from the image processing circuit 110 is also input into the histogram processing unit 118. The histogram processing unit 118 generates a brightness distribution chart (an entire brightness distribution chart indicating the brightness distribution of the entire area in the image data for display and a partial brightness distribution chart indicating the brightness distribution of a predetermined area only) based on the brightness data of the image data for display (S208). The specified area is a range specified by, for example, target marks described later, metering, AF, an exclusive cursor, etc., and a partial brightness distribution chart is generated by the brightness data in the range. The brightness distribution chart is overlaid on the image data for display and displayed on the display unit 114 (S210). The partial brightness distribution chart and the entire brightness distribution chart can be displayed in different colors on the display unit 114, thereby clearly indicating to the photographer the brightness distribution of the predetermined area relative to the brightness distribution of the entire subject image. Then, the photographer compares the image data for display displayed on the display unit 114 with the brightness distribution chart, and issues a shoot instruction from the operation unit 120 when it is determined that a predetermined exposure has been obtained. Then, the presence/absence of a shoot instruction by the operation unit 120 is determined (S212). If it is determined that the shoot instruction has been issued, the shooting is performed (S214). If there is no shoot instruction, control is returned to step S202, an exposure is performed, and a series of displaying process is repeated.

In step S202, the value set in the exposure time setting unit 104 can be set again by an operation, etc. from the operation unit 120.

Described below are the tools for specifying a predetermined area of a subject image to be a partial brightness distribution (also referred to as a predetermined brightness distribution), and an example of the case in which a specified predetermined brightness distribution is displayed relative to the entire brightness distribution on the display unit 114.

FIG. 3 shows an example of displaying by index the brightness distribution of the image data for display enclosed by the target marks displayed at the center of the display screen (display unit 114) of the digital camera.

Figure 4:
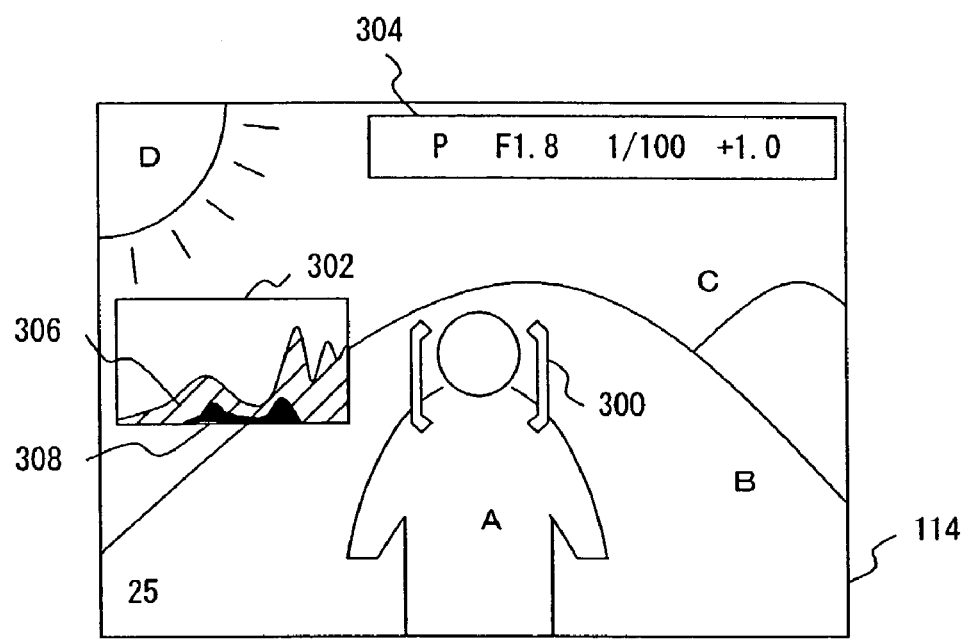
FIG. 4 shows an example of raising one level of the exposure correction level from the state shown in FIG. 3.

As shown in FIG. 3, the subject is configured by the mountain B, the sky C, and the sun D surrounding the person A. The subject image is retrieved by the CCD 102, and the generated image data for display is displayed on the display unit 114. Based on the display selection from the operation unit 120, the display unit 114 displays target marks 300 at the center, the brightness distribution chart 302 of a predetermined size on the left, a set value 304 of the current exposure condition at the top, that is, the exposure mode (P indicating the program mode), the iris (F1.8), the shutter speed (1/250), and the exposure correction (+0.0) from left to right, and the number of pieces (25) to be currently shot at the lower left corner. In the brightness distribution chart 302, the brightness value is indicated along the horizontal axis (for example, 0 through 255 levels for 8 bits), and the brightness distribution is displayed indicating the count value of the brightness value of the pixels in a specified area along the vertical axis. In this example, an entire brightness distribution 306 indicating the brightness distribution relative to the entire subject image is displayed as a diagonally shaded area, and a predetermined brightness distribution 308 indicating the brightness distribution of an area (specified area) enclosed by the target marks 300 is overlaid in black on the diagonally shaded area. In the example shown in FIG. 3, the predetermined brightness distribution 308 is positioned to the leftward from the center of the entire brightness distribution 306, that is, the brightness value is a little small. If the exposure correction level of the image data for display is increased by 1 level by the operation unit 120, then the brightness distribution chart 302 of the display unit 114 is shown in FIG. 4. That is, by increasing the exposure correction level by one level, the brightness of the image data for display is enhanced, and the predetermined brightness distribution 308 is also enhanced, thereby moving toward the center of the brightness value. The set value of the exposure correction displayed at the top of the display unit 114 is +1.0. As described above, the entire brightness distribution 306 and the predetermined brightness distribution 308 are displayed on the display unit 114 as the brightness distribution charts, a correct exposure setting can be realized by comparing the distribution charts. Since the display styles are different and overlaid, the two distribution charts can be displayed in a small space.

FIGS. 5 through 8 show examples of the cases in which the specified area of the predetermined brightness distribution is not indicated by the target marks but by a metering area.

FIG. 5 shows an example of the case in which the metering area of the average metering for performing the metering operation by evaluating the entire brightness distribution of the image data for display with the focal length and the brightness taken into account is defined as a specified area. Since the metering area includes the entire image data for display, the entire range of the entire brightness distribution 306 is displayed in the predetermined brightness distribution 308 of the brightness distribution chart 302 as shown in FIG. 5. In this example, there is an icon displayed at the upper right indicating that the metering method is average metering.

Similarly in the example described below, when the specified position or the specified range of the metering area is changed, the metering condition is changed and the shutter speed is also changed. Therefore, the value of the shutter speed displayed on the display unit 114 is changed from the value shown in FIG. 3.

FIG. 6 shows an example in which the metering area is an area enclosed by a rectangle of about a ¼ size of the image data for display at the center of the image data for display, and the metering area is defined as a specified area. As shown in FIG. 6, the metering area is shown by the broken lines, and the predetermined brightness distribution 308 of the metering area is displayed black relative to the entire brightness distribution 306 indicated by the diagonal lines in the brightness distribution chart 302. As compared with the case shown in FIG. 3, the target area of the predetermined brightness distribution is larger. Therefore, the area of the predetermined brightness distribution is larger than in the case shown in FIG. 3. Also in this example, there is an icon at the upper right of the display unit 114 indicating that the metering method is the centerweighted metering.

FIG. 7 shows an example in which the metering area is an area enclosed by a rectangle of about a 1/25 size of the image data for display at the center of the image data for display, and the metering area is defined as a specified area. As shown in FIG. 6, the metering area is shown by the broken lines (in the following example, a specified area or an area which can be specified is shown by broken lines in the drawings), and the predetermined brightness distribution 308 of the metering area is displayed black relative to the entire brightness distribution 306 indicated by the diagonal lines in the brightness distribution chart 302. Also in this example, there is an icon 310 at the upper right of the display unit 114 indicating that the metering method is the spot metering.

FIG. 8 shows an example of the case in which a metering area enclosed by a movable rectangular cursor is defined as a specified area. The metering area is as large as the area shown in FIG. 7. FIG. 8-1 shows an example of the case in which the center of the image data for display matches the center of the metering cursor, and the predetermined brightness distribution 308 of the area enclosed by the rectangle is indicated in black relative to the entire brightness distribution 306 shown by the diagonal lines in the brightness distribution chart 302. The metering cursor can be freely moved in the display unit 114 by operating the cross key button as shown in FIG. 8-2 from the operation unit 120. In this example, an upper button 312 is pressed as shown in FIG. 8-2 from the state shown in FIG. 8-1. The result is the upward movement of the metering cursor as shown in FIG. 8-3. At this time, since the specified area is within the metering cursor, the brightness distribution of the area (a part of the sky C in this example) specified by the metering cursor is displayed as the state of a shift toward higher brightness in the brightness distribution chart 302. Since spot metering is adopted in this example, the icon 310 indicating the spot metering is displayed at the upper right on the display unit 114. Thus, since the predetermined brightness distribution corresponds to the brightness of the metering area, it also corresponds to the AE.

Figure 9:
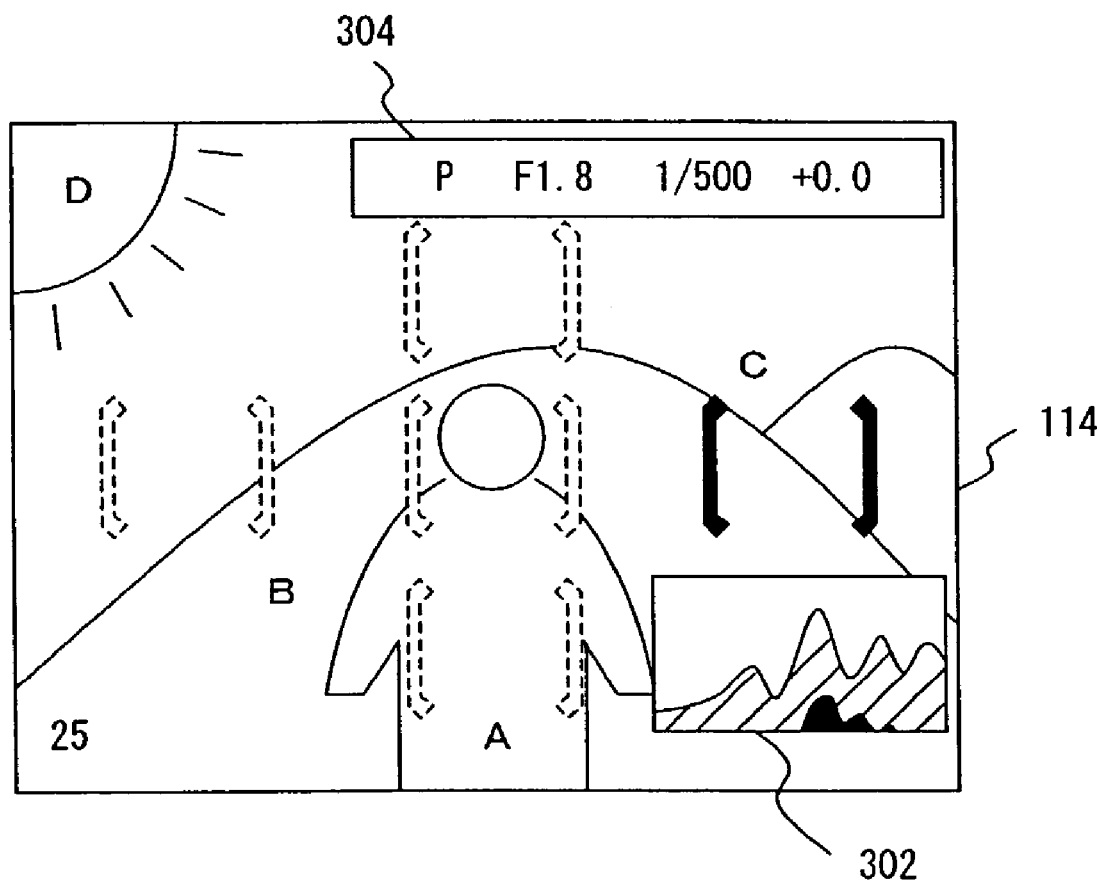
FIG. 9 shows an example of the case in which an AF area is defined as a specified area.

FIG. 9 shows an example of the specified area of the predetermined brightness distribution defined as an autofocus (AF) area. In the example shown in FIG. 9, five AF areas have already been set in a cross arrangement. A desired AF area is selected by pressing the cross key button of the operation unit 120 shown in FIG. 8-2 from among these AF areas, and the predetermined brightness distribution of the AF area is displayed on the display unit 114. In the example shown in FIG. 9, the right AF area is selected, and the predetermined brightness distribution of the AF area is displayed on the display unit 114 in the above-mentioned manner. Since the predetermined brightness distribution corresponds to the brightness of the focusing range, an exposure can be easily set for a focusing target.

Figure 10:
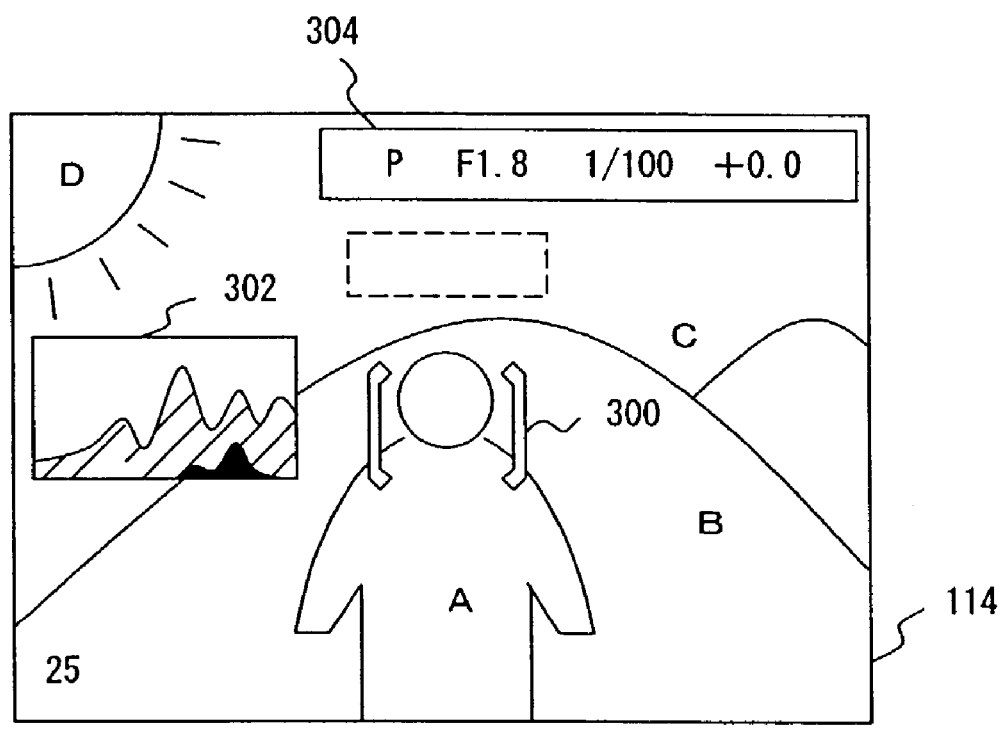
FIG. 10 shows an example of the case in which the area enclosed by the exclusive cursor is defined as a specified area.

FIG. 10 shows an example of a specified area of a predetermined brightness distribution as an area enclosed by the exclusive cursor for metering the brightness distribution. In the example shown in FIG. 10, a rectangular exclusive cursor is set above the AF area, and an area enclosed by the exclusive cursor is displayed in the brightness distribution chart 302 in the above-mentioned manner. The exclusive cursor can be freely moved on the display unit 114 although not shown in the attached drawings by operating the cross key button of the operation unit 120 as shown in FIG. 8-2, and a specified destination area is displayed in the brightness distribution chart 302 in the above-mentioned manner.

Figure 11:
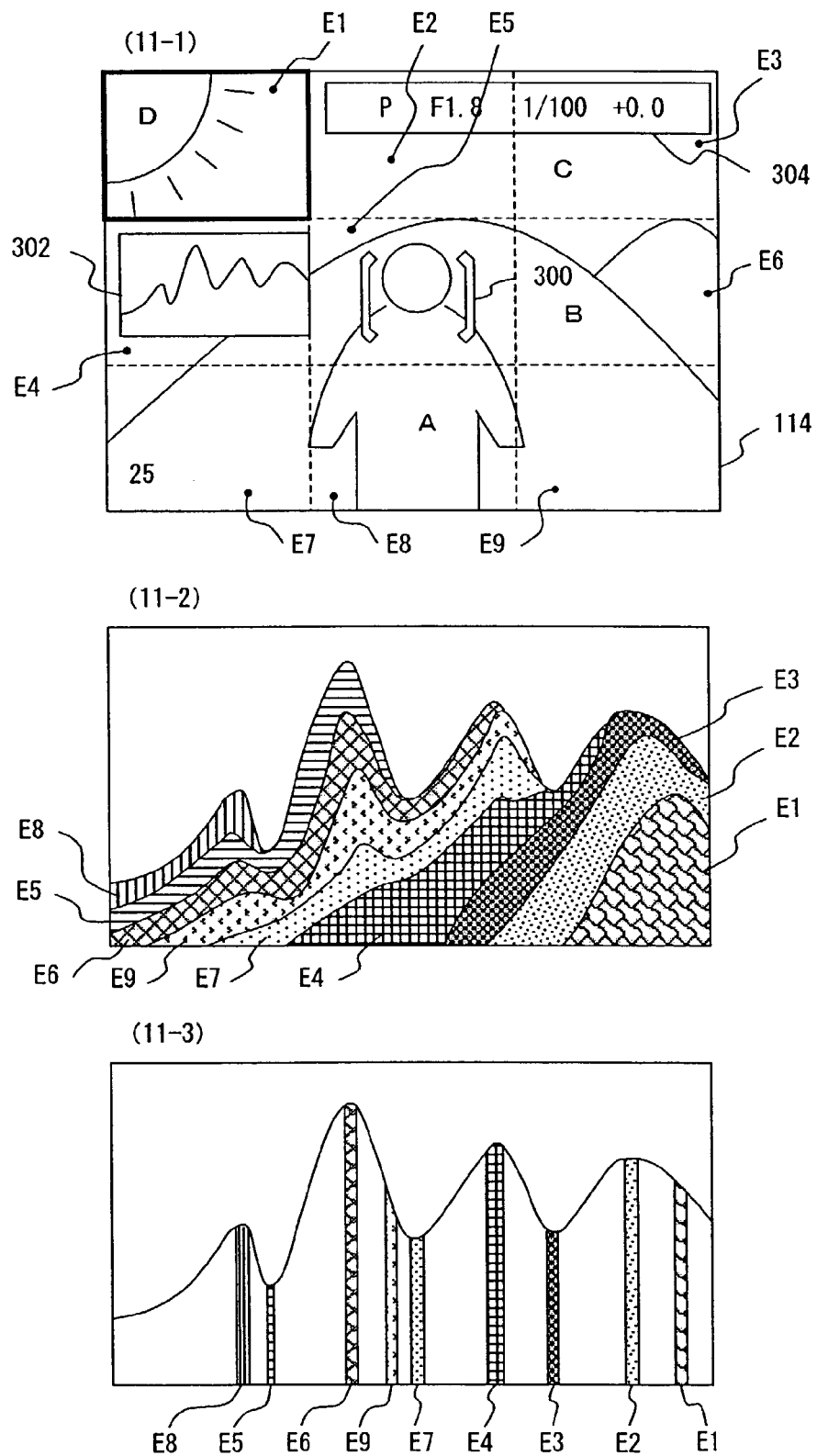
FIG. 11 shows an example of the case in which the brightness distribution of a plurality of specified areas is displayed as a colored brightness distribution chart 302.

FIG. 11-1 shows an example of dividing the screen into a plurality of areas, and displaying the brightness distributions of the respective areas in the respective colors in the brightness distribution chart 302. In this example, the screen is divided into nine equal sections (E1 through E9) as shown by the broken lines in the display unit 114, and the predetermined brightness distributions of the respective predetermined areas are displayed in respective colors in the brightness distribution chart 302. FIG. 11-2 is an enlarged view of the brightness distribution chart 302. The areas in different colors shown by E1 through E9 in FIG. 11-2 indicate the respective brightness distributions corresponding to the brightness of the respective areas E1 through E9 shown in FIG. 11-1. The average brightness value of each predetermined area can be displayed in each color relative to the entire brightness distribution in the brightness distribution chart 302 as shown in FIG. 11-3. In this example, all divided areas are not displayed in the brightness distribution chart 302, but a divided area specified by operating the cross key button from the operation unit 120 as shown in FIG. 8-2 can be displayed as a predetermined area in the brightness distribution chart 302 in the above-mentioned manner. Furthermore, the above-mentioned predetermined brightness distributions can be displayed in the respective colors. Thus, the brightness of the entire area of the screen can be collectively determined by displaying the above-mentioned predetermined brightness distributions.

FIG. 12 shows an example of the method of displaying an enlarged brightness distribution chart 302. The above-mentioned predetermined area, especially a predetermined area specified by spot metering has a small number of pixels. Therefore, the displayed area is small relative to the entire brightness distribution and has poor visual recognizability. As a result, in this example, the predetermined brightness distribution is enlarged and displayed relative to the entire brightness distribution. As shown in FIG. 12, the brightness distribution chart 302 shown in FIG. 12-1 contains a small predetermined brightness distribution 308 while the entire brightness distribution 306 is unchanged and the predetermined brightness distribution 308 is enlarged and displayed as a new brightness distribution chart (12-2). The new brightness distribution chart can be set as is, or can be exchanged with FIG. 12-1 by the selection switch button from the operation unit 120. Thus, there are various switching methods.

FIG. 13 shows an example of a method of displaying a predetermined brightness distribution displayed on the brightness distribution chart 302. It is especially effective when the brightness distribution of a predetermined area can be distributed. In this example, an average brightness of the predetermined brightness distribution is obtained, and the average brightness value is displayed with an indication mark 314 such as Δ near (immediately below the brightness distribution chart 302 in the example shown in FIG. 13-1) the brightness distribution chart 302 as shown in FIG. 13-1. In another example, as shown in FIG. 13-2, a perpendicular 316 is displayed over the counting direction in the position of the average brightness value in the brightness distribution chart 302, another indication mark 318 such as ∇, etc. can be displayed above the position of the average brightness value in the brightness distribution chart 302 as shown in FIG. 13-3, and there are other various indicating methods.

Furthermore, in the display layout of the brightness distribution chart described above, the size, shape, and arrangement can be appropriately set, and it is desired that the image data for display be infinite in size, shape, and arrangement.

Additionally, a semitransparent brightness distribution chart can be overlaid on the image data for display, the brightness distribution chart can be displayed or concealed by switching according to an instruction from the operation unit 120, etc. Thus, the display method can be appropriately set.

The entire brightness distribution is to be apparently distinguished from a predetermined brightness distribution, and the method of visually recognizing the difference can be appropriately selected in addition to the display in different colors.

In the present embodiment, the histogram display is performed by the configuration of the brightness distribution chart by a brightness value and a count value. However, for example, a graph display such as a pie chart, etc. can be used depending on the situation.

Furthermore, various cursors for specification of a predetermined area can be in any shape in addition to a rectangle.

A brightness distribution chart can be displayed independent of image data for display, and an exclusive display unit can be provided for display of a brightness distribution chart only.

In the present embodiment, various types of brightness distributions are displayed for the image data for display obtained in the standby state for shooting. However, for example, recording image data for display is read from the recording unit not shown in the attached drawings to the display unit 114 to display the above-mentioned various brightness distributions for the read image data for display.

Furthermore, in the present embodiment, the above-mentioned various brightness distribution charts are displayed for the digital camera. However, for example, the display can be applied in the standby state for shooting a still image and a moving picture on the video camera, to a read of shot image data to the display unit, etc.

In a digital camera with the above-mentioned configuration, since the relationship in brightness distribution between the entire shot subject image and the predetermined area of the subject image can be clarified. Therefore, for example, when the brightness value of the entire brightness distribution during shooting is biased, the photographer is not easily allowed to adjust the exposure condition such that the bias can be adjusted, but reference values can be obtained to set the exposure condition with the balance between the entire subject image and a predetermined area taken into account by adjusting the exposure condition in consideration of the appropriateness of the brightness value of a target area.

Furthermore, by defining the specification of the predetermined area as a metering area, the brightness distribution of the metering area can be correctly obtained.

Furthermore, by defining the specification of the predetermined area as a focusing area, the brightness distribution of the focusing area can be correctly obtained, and by moving the focusing area, the brightness distribution can be checked in any area in which it can be moved in the subject image.

Additionally, by specifying the above-mentioned predetermined area by an exclusive cursor, the brightness distribution in the exclusive cursor can be correctly obtained, and by moving the exclusive cursor, the brightness distribution can be checked in any area in which it can be moved in the subject image.

Furthermore, by simultaneously displaying the brightness distributions of a plurality of predetermined areas of a subject image, the relationship in brightness distribution between mutual specified areas can be correctly obtained.

Additionally, by enlarging and displaying the brightness distribution of a specified area, the brightness distribution of a small specified area can be correctly obtained.

In addition, by adding an indication mark indicative of an average of the brightness distributions of a specified area to a brightness distribution chart, the relationship between the brightness distributions of dispersed specified areas and the entire brightness distribution can be correctly obtained.

The second aspects of the present invention are described below.

One of the second aspects of the present invention is configured by an image pickup unit for outputting an electronic shot image, a metering unit for computing a metering value from the shot image, a brightness distribution chart generation unit for generating a distribution chart of brightness values from the shot image, and a display unit for displaying the brightness distribution chart. The display unit displays a metering value near the brightness value of the brightness distribution chart corresponding to the metering value.

Furthermore, the brightness distribution chart generation unit can be generated by a logarithm axis as an axis relating to the brightness value of the brightness distribution chart.

With the above-mentioned configuration, the correspondence between the brightness distribution chart and the brightness value of a metering range can be maintained.

Furthermore, the display unit can also display the metering values obtained by metering a plurality of points by the metering unit as the display of the metering values in the positions corresponding to the respective brightness values.

With the above-mentioned configuration, the correspondence between the brightness distribution chart and the brightness values of a plurality of metering ranges can be maintained.

When the display unit comprises a display control unit for controlling whether or not a metering value is to be displayed and the metering value is not displayed, the brightness distribution chart generation unit can generate the axis relating to the brightness value of the brightness distribution chart as a linear axis.

With this configuration, the metering value can or cannot be displayed selectively. When it is not displayed, the axis relating to the brightness value of the brightness distribution chart can be generated as a linear axis.

Furthermore, the display unit can be configured to display the axis for display of a metering value along the axis relating to the brightness value or the brightness distribution chart, and display the plurality of metering values corresponding to the axis for display of a metering value.

With this configuration, the correspondence between the brightness distribution chart and the brightness values of a plurality of metering ranges can be more clearly obtained.

The brightness distribution chart generation unit can also be configured to comprise a conversion unit for canceling the tone conversion for the shot image handled in the tone converting process.

With this configuration, the tone converting process performed on the shot image can be canceled.

Another second aspect of the present invention is a method of generating a brightness distribution chart with the brightness axis represented by a logarithm based on the shot image output from the image pickup unit, computing the metering value from the shot image, and displaying the computed metering value near the position corresponding to the brightness of the brightness distribution chart.

In this method, the correspondence between the brightness distribution chart and the brightness value of a metering range can be maintained.

The embodiment of the second aspect according to the present invention is described below in detail by referring to the attached drawings.

Figure 14:
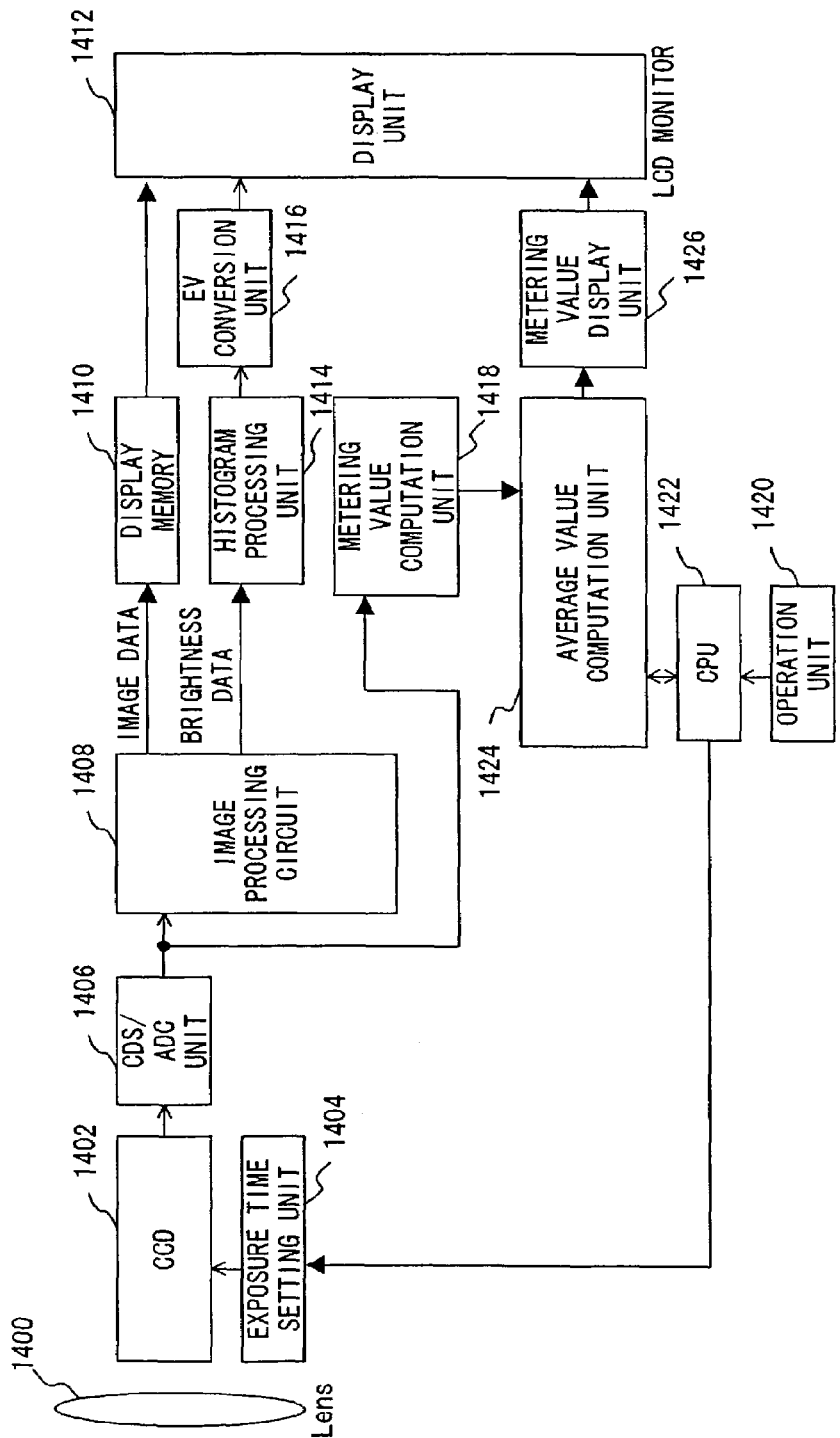
FIG. 14 is a block diagram of a digital camera of an embodiment according to the second aspect of the present invention.

FIG. 14 is a block diagram of a digital camera as an example of an embodiment of the second aspect according to the present invention.

In FIG. 14, a lens 1400 is configured by an optical lens. On the optical axis, a CCD 1402 is configured, and the exposure time of the CCD 1402 is adjusted by the settings of an exposure time setting unit 1404. When an image signal of a subject input through the lens 1400 is converted into an electric signal in the CCD 1402, the subject image is processed by a CDS/ADC unit 1406 in a gain adjustment, a noise reducing process, a process for conversion into digital image data, etc. The digital image data (for example, a through image in a standby state for shooting which is thinly read from the CCD 1402) output from the CDS/ADC unit 1406 is output to an image processing circuit 1408, and handles in the tone converting process, the resizing process, the brightness data extracting process, etc. for display. The tone converting process is performed to correct the brightness characteristic for complement of the CCD characteristic. Display memory 1410 temporarily stores the digital image data resized by the image processing circuit 1408 for display on a display unit 1412 (for example, a monitor such as an LCD, etc.). A histogram processing unit 1414 generates a brightness distribution chart based on the brightness data of the digital image data processed by the image processing circuit 1408, and an EV conversion unit 1416 performs on the brightness distribution chart obtained by the histogram processing unit 1414 an EV value converting process for inverse tone conversion and logarithm conversion such that the tone conversion of the image processing circuit 1408 can be canceled. The brightness distribution chart corresponding to the EV value is displayed on the display unit 1412. A metering value computation unit 1418 computes a metering value from the digital image data output from the CDS/ADC unit 1406. An operation unit 1420 issues an instruction to a CPU 1422 in each operation such as opening/closing a shutter, display mode selection, etc. for the display unit 1412. An average value computation unit 1424 holds a metering value obtained from the metering value computation unit 1418 at an instruction of the CPU 1422, and computes an average value of metering values from all of the held metering values. The CPU 1422 sets the exposure time setting unit 1404 based on the computation result. A metering value display unit 1426 allows the display unit 1412 to display a multi-metering bar indicating all of the held metering values, etc. The CPU 1422 is a central processing unit, and controls the entire operation of the digital camera by reading a program from memory not shown in the attached drawings and executing it.

Figure 15:
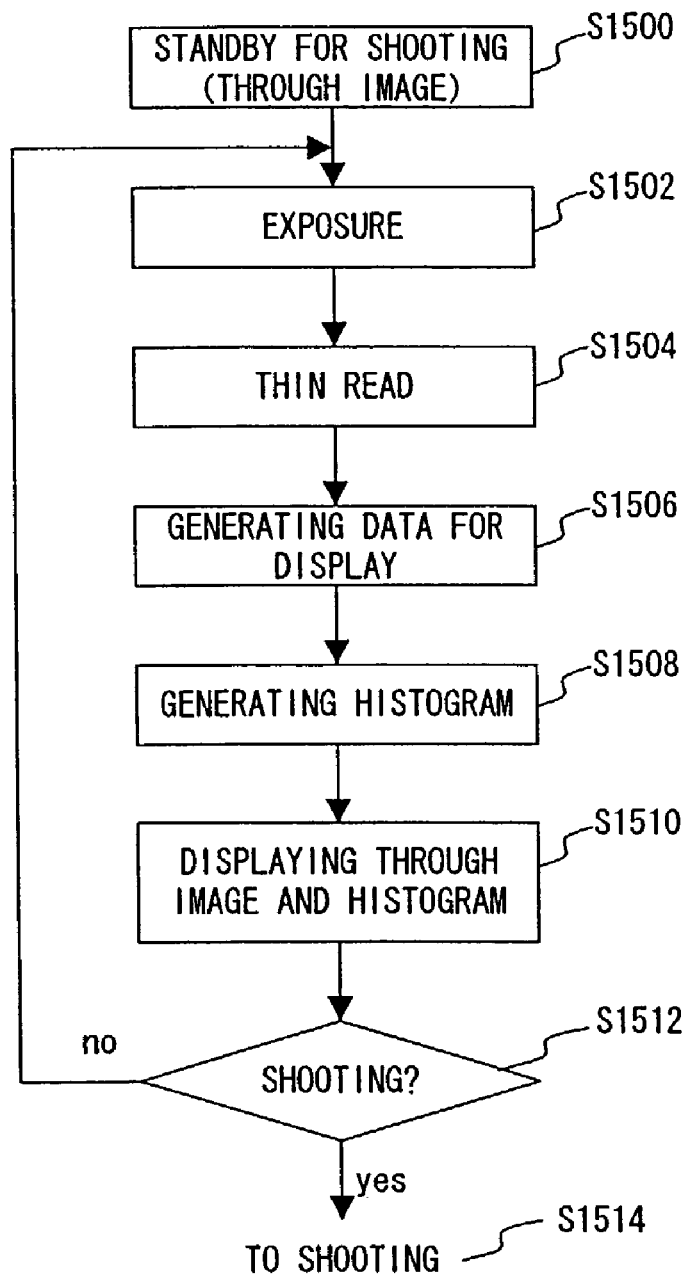
FIG. 15 shows an example of an operation flow in a standby state for shooting of the digital camera shown in FIG. 14.

FIG. 15 shows an example of an operation flow in the standby state for shooting of a digital camera with the above-mentioned block configuration.

In the standby state for shooting in which a through image of a subject is displayed on the display unit 1412 (S1500), when an exposure time adjustment is performed on the CCD 1402 based on the setting of the exposure time setting unit 1404 by the metering value average computation, the EV value change, etc. by the average value computation unit 1424 executed from the CPU 1422 according to the operation instruction from the operation unit 1420 (S1502), a subject image is thinly read from the CCD 1402 based on the setting (S1504), and the thinly read subject image (through image) is gain-adjusted by the CDS/ADC unit 1406, and further handled in the process of RGB conversion, tone conversion, etc. in the image processing circuit 1408. A through image generated in these converting processes is stored in the display memory 1410 (S1506). Furthermore, based on the brightness data of a through image processed in the image processing circuit 1408, the relationship between the brightness distribution chart of the through image, for example, a brightness value and the number of corresponding pixels is generated by the histogram processing unit 1414, and the brightness distribution chart is processed in the logarithm conversion and the inverse tone conversion by the EV conversion unit 1416 (S1508). The brightness distribution chart converted by the EV conversion unit 1416 and the multi-metering bar output from the metering value display unit 1426 are displayed on the display unit 1412 together with the through image stored in the display memory 1410 (S1510). The photographer compares the through image, brightness distribution chart, and multi-metering bar displayed on the display unit 1412. Then, it is determined whether or not the photographer has pressed the shutter button which is a part of the operation unit 1420 (S1512). If the button is pressed, the shooting process is performed (S1514). If it is not pressed, then control is returned to step S1502, and a series of processes from exposing to display of a through image and a histogram is repeated.

After the brightness distribution chart of a through image processed in the image processing circuit 1408 is generated by the histogram processing unit 1414 in step S1508, the EV conversion unit 1416 performs an EV conversion. However, if an operation instruction not to display a multi-metering bar is issued to the display unit 1412 by the operation unit 1420, then the EV conversion unit 1416 outputs the brightness distribution chart to the display unit 1412 without performing the EV conversion.

After the histogram processing unit 1414 generates a brightness distribution chart of a through image processed in the image processing circuit 1408 in step S1508, the brightness distribution chart can be displayed on the display unit 1412 without performing the EV conversion by the EV conversion unit 1416, and the multi-metering bar based on the tone conversion curve can be displayed on the display unit 1412 from the metering value display unit 1426. In this case, the metering value display unit 1426 in FIG. 14 is assumed to generate a multi-metering bar based on the tone conversion curve.

The EV conversion id explained below by referring to FIG. 16. In the following explanation, the brightness value is assumed to be 256 levels from 0 to 255.

FIG. 16 is a graph indicating the conversion of the brightness value represented by 256 levels from 0 to 255 into the EV value which is a unit of metering on the digital image data output from the histogram processing unit 1414 in the digital camera of this example. Practically, it is a curve of the combination of the conversion by an inverse curve of the tone conversion curve and the logarithm conversion for EV conversion. FIG. 16 shows the origin alignment between the multi-metering origin (the origin (0 point) of the EV value in FIG. 16) which is an average metering value obtained from a plurality of areas in the digital image data and the brightness value (the value of 128 in this example) which is a shooting target (exposure reference), and the EV values corresponding to the brightness values from 0 to 255 based on the origin. The graph is expressed by the brightness values from the value of 0 to the value of 255 of the horizontal axis and the EV values indicating the values (scales indicating the multi-metering bar in this example) from −3 to +3 of the vertical axis. The relationship between the brightness value and the EV value in the digital camera of this example is linear near the origin (128, 0) as shown in FIG. 16, but indicates a logarithm graph showing a larger amount of change at a point farther from the origin.

FIGS. 17 through 22 show examples of the method of displaying the brightness distribution chart and the corresponding multi-metering bar.

FIG. 17 shows the brightness distribution chart generated by the histogram processing unit 1414 and not EV-converted using the horizontal axis indicating the brightness value and the vertical axis indicating the number of pixels corresponding to the brightness value. Below the brightness distribution chart, the multi-metering bar is displayed by EV values indicating the correspondence to the brightness value shown in FIG. 16. As shown in FIG. 17, the origin alignment is performed between the value of 128 of the brightness value and the value of 0 of the EV value, and the scales of the brightness value shown in the brightness distribution chart is indicated at equal intervals while the EV value which is the unit of the multi-metering bar shows scales at shorter intervals at points farther from the value of 0.

Figure 18:
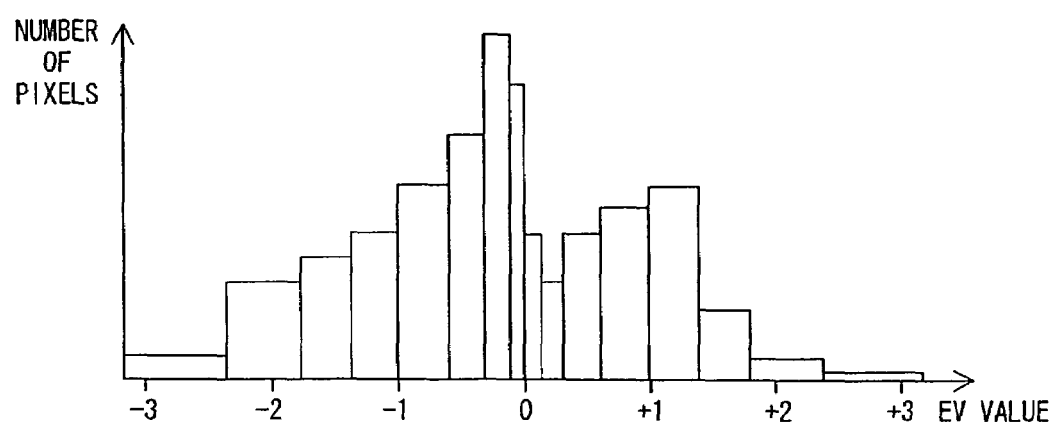
FIG. 18 shows an example of a brightness distribution chart in which the scale of brightness values shown in FIG. 17 is changed based on the graph shown in FIG. 16.

FIG. 18 shows an example of the case in which an EV conversion is performed including the logarithm conversion of the brightness value with the scales of EV values of the multi-metering bar shown in FIG. 17 set at equal intervals based on the graph shown in FIG. 16. The brightness distribution chart shown in FIG. 18 is obtained by converting the intervals of the brightness values by the EV conversion unit 1416 based on the graph shown in FIG. 16 with the number of pixels corresponding to each brightness value of the brightness distribution chart generated by the histogram processing unit 1414 fixed. In this example, the multi-metering bar indicating the equal intervals of the scales of the EV values is displayed on the display unit 1412 after being origin-aligned between the brightness value of 128 and the EV value of 0 from the metering value display unit 1426. The intervals of the scales of the brightness value displayed at equal intervals is shorter from a point closer to an EV value of 0, and longer from a point farther from the EV value of 0.

FIG. 19 shows a chart in which scale intervals of the brightness values of the brightness distribution chart shown in FIG. 18 are equal. In FIG. 19, the number of pixels corresponding to the brightness value close to the 0 point of the EV value displayed in FIG. 18 is averaged at predetermined intervals indicated by the EV value, interpolation is performed such that the number of pixels corresponding to the brightness value at points farther from 0 of the EV value corresponds to the predetermined scale intervals indicated by the EV values, and a smooth brightness distribution chart can be displayed with the predetermined scale intervals indicated by the multi-metering bar corresponding to the EV values.

This process can be performed by the EV conversion unit 1416.

FIG. 20 shows the brightness distribution chart displayed by a bar graph shown in FIG. 17 by a smooth curve. The intervals of the brightness value axis and the scale intervals of the EV value, etc. are the same as those shown in FIG. 17. The conversion into a smooth curve is performed by the EV conversion unit. As compared with the bar graph shown in FIG. 17, the operation is simpler and is preferably applied to a small display unit provided on the back of the digital camera.

FIG. 21 shows the EV conversion of the brightness value of the brightness distribution chart shown in FIG. 20 as the EV conversion of the brightness distribution chart shown in FIG. 17 into the brightness distribution chart shown in FIG. 18. FIG. 21 is an expanded view of the difference between the number of pixels at the center of the brightness and the number of pixels on both sides of the brightness distribution chart, shown in FIG. 20. In FIG. 22, the shape of the brightness distribution chart largely transformed in FIG. 21 from the original shape of the brightness distribution chart is processed to return to the original shape. Practically, the pixel number axis is reduced around the central brightness values (around the values of 128) on the brightness distribution chart shown in FIG. 21, and the brightness values on both sides (values 0 and 255) are processed to increase the number of pixels. This process is performed by the EV conversion unit 1416.

In the display as shown in FIG. 22, a distribution form similar to the original brightness distribution chart is displayed, and there is a small shape change before and after the EV conversion, thereby preventing the photographer from being puzzled.

Furthermore, the method of approximating the form of the brightness distribution chart after the EV conversion to the form of the brightness distribution chart before the EV conversion can be performed in various manners other than the above-mentioned method.

Then, an example of displaying the display unit 1412 of the digital camera in the standby state for shooting according to the present embodiment is described below by referring to FIG. 14.

Figure 23:
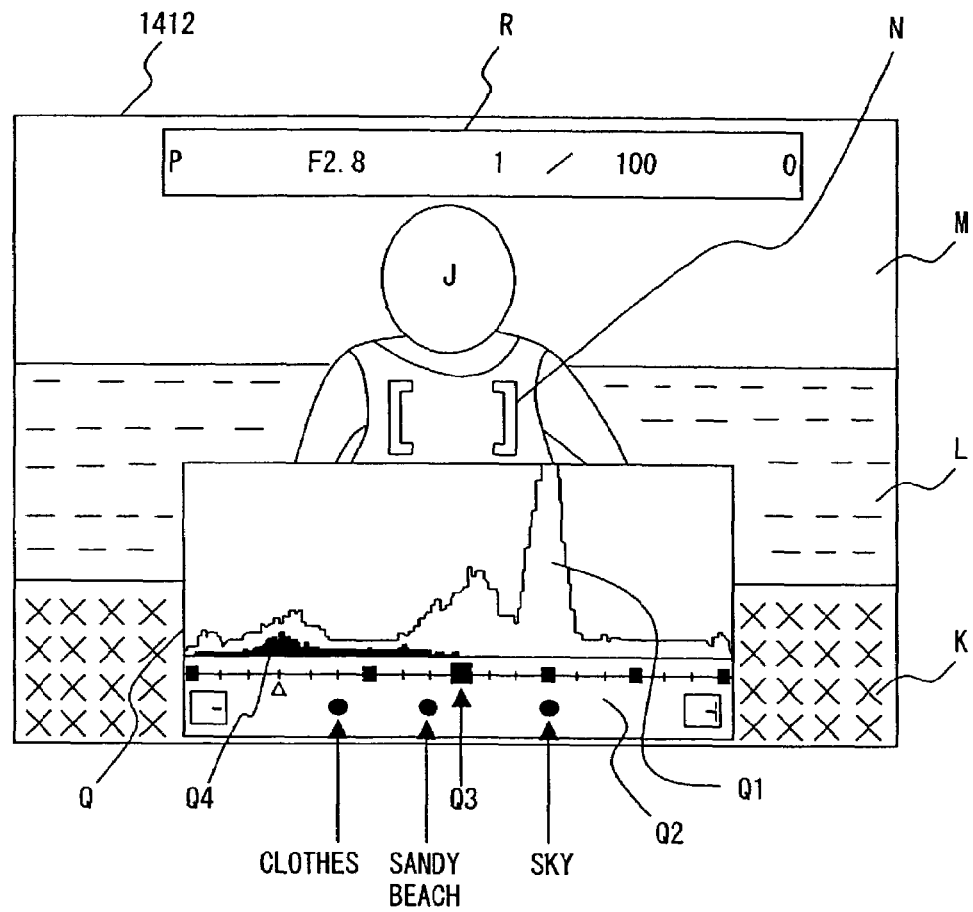
FIG. 23 shows an example of displaying a display unit of the digital camera shown in FIG. 14 in the standby state for shooting.

FIG. 23 shows an example of displaying a through image displayed on the display unit 1412 of the digital camera in the standby state for shooting. As shown in FIG. 23, a subject with the person J in the center, and the sandy beach K, the sea L, and the sky M in the background are displayed on the display unit 1412. The display unit 1412 displays the target marks N in the center, the brightness distribution chart Q of a predetermined size below the target marks, the set value R of the current exposure condition above the target marks, that is, the exposure mode (P indicating a program), the iris (F2.8), the shutter speed (1/100), and the exposure correction (0) from left to right in the display switching operation from the operation unit 1420. In the brightness distribution chart Q, the brightness distribution chart Q1 obtained after EV-converting the brightness distribution chart with horizontal axis as the brightness value and the vertical axis as the number of pixels is displayed, and the multi-metering bar Q2 obtained by origin alignment between the value of 128 of the brightness value of the brightness distribution chart Q1 and the EV value of 0 is also displayed. Furthermore, the multi-metering bar Q2 is provided with the scales at equal intervals on the left and right of the central origin Q3, and a plurality of metering values held in the average value computation unit 1424, that is, the clothes of the person J, the metering values metered in a predetermined area such as the sandy beach K and the sky M are indicated by black circles, and the EV value corresponding to the area in the current target marks N is indicated by a white triangle. A histogram Q1 is displayed with the brightness distribution chart Q4 in the current target marks colored in black relative to the brightness distribution chart of the entire subject indicated by an outlined white portion.

In the present embodiment, the brightness value to be a shooting target is 128, but the value is not limited to 128.

It is desired that, in the display layout of the brightness distribution chart Q, the size, shape, and arrangement can be appropriately set, and the through image to be displayed with the brightness distribution chart Q can be large enough not to be easily hidden.

Furthermore, a semitransparent brightness distribution chart Q can be overlaid on the through image for display.

The brightness distribution chart and the through image can be independently displayed, and a display unit for exclusively displaying the brightness distribution chart can be provided.

It is also possible to display or conceal the brightness distribution chart Q in a switching operation indicated by the operation unit 1420.

Furthermore, a method of visually distinguishing the brightness distribution chart of the entire image from the brightness distribution chart in the target marks N by different colors, patterns, etc. can be appropriately adopted.

According to the present embodiment, a digital camera is described for example. However, for example, a video camera, etc. can also be exemplified for the present invention.

As described above, according to the present embodiment, a brightness distribution chart can be converted based on the relationship shown in FIG. 16 to correctly obtain the correspondence between the brightness distribution chart and the multi-metering bar, and also correctly obtain the exposure correction based on the comparison between the brightness distribution chart by the photographer and the brightness value of the metering range.

Described below is the third aspect of the present invention.

One of the third aspects of the present invention is configured by an image pickup unit for outputting image data for recording or image data (a through image) for a through image; a brightness distribution chart generation unit for generating a brightness distribution chart based on the output image data; and a shot image check unit for displaying an image based on the output image data and the brightness distribution chart on a display unit. The shot image check unit displays a brightness distribution chart generated based on the image data for recording together with an image based on the image data for recording immediately after shooting.

With this configuration, immediately after the shooting, the brightness distribution chart can be checked on the display unit together with the shot image data for recording.

The shot image check unit can also be configured such that a brightness distribution chart generated based on the image data for a through image can be displayed together with an image based on the image data for the through image before a shoot instruction.

With this configuration, before a shoot instruction and after shooting, the image data and the brightness distribution chart respectively corresponding to the timings above can be checked on the display unit.

Furthermore, the shot image check unit can also be configured such that the image and the brightness distribution chart can be displayed for a predetermined time only immediately after the shooting.

With the above-mentioned configuration, the time for which the image and the brightness distribution chart are displayed on the display unit after the shooting is limited to a predetermined time.

Furthermore, an instruction unit for issuing an instruction to remove the brightness distribution chart from the display immediately after the shooting is provided. The shot image check unit can also be configured to display only the image when the instruction is issued for a shorter predetermined time as compared with the case in which the image and the brightness distribution chart are displayed.

With this configuration, when only an image is displayed, a display time can be shorter, and, for example, the next operation can be easily started.

Furthermore, the shot image check unit can also be configured such that the display can be stopped even during the predetermined time if a predetermined operation is performed.

With this configuration, the display can be stopped by a predetermined operation even during the display.

Additionally, the image data for a through image can be configured by a smaller number of pixels than the image data for recording.

With this configuration, the image data and the brightness distribution chart respectively corresponding to the timings of "before a shoot instruction" and "after the shooting" can be displayed on the display unit based on the respective numbers of pixels.

Another third aspect of the present invention is a program used to direct a computer of the image pickup apparatus to perform the shot image checking process comprising the steps of: generating a brightness distribution chart based on a through image before shooting, and displaying the generated brightness distribution chart together with the through image; and generating a brightness distribution chart based on a recording image having a larger number of pixels than the through image after shooting, and displaying the generated brightness distribution chart together with the recording image.

With the above-mentioned program, the computer can be directed to generate the brightness distribution charts before and after shooting based on the image data having different number of pixels before and after shooting, and display the brightness distribution charts together with the image data corresponding to the brightness distribution charts.

A further third aspect of the present invention is a shot image checking method for checking a shot image of a digital camera comprising the steps of: generating a first brightness distribution chart based on a through image output from an image pickup unit for outputting a shot image before shooting, and displaying the first brightness distribution chart together with the through image; and generating a second brightness distribution chart based on a recording image having a larger number of pixels than the through image output by the image pickup unit after shooting, and displaying the second brightness distribution chart on the display unit together with the recording image.

With the above-mentioned method, the brightness distribution charts before and after shooting can be generated based on the shot images having different number of pixels before and after shooting.

The embodiment of the third aspect of the present invention is described below in detail by referring to the attached drawings.

FIG. 24 is a block diagram of a digital camera as an example of the third embodiment of the present invention.

In FIG. 24, a lens 2400 is configured by an optical lens. On the optical axis, an iris 2401 and a CCD 2402 are configured in this order, and the iris 2401 is adjusted based on the setting by an iris setting unit 2403. The exposure time of the CCD 2402 is adjusted based on the setting of an exposure time setting unit 2404. When a subject image noise reducing process input through the lens 2400 is converted into an electric signal by the CCD 2402 through the iris 2401, the image signal of the subject is handled by a CDS/ADS unit 2406 in the gain adjusting process based on the setting by a gain setting unit 2405, the noise reducing process, the process converting data into digital image data, etc. Based on the data obtained from the CDS/ADS unit 2406, a metering unit 2408 for setting a reference as to whether or not a strobe light 2407 is to be emitted performs metering. During shooting (recording), all pixels are read from the CCD 2402, and the image data of all pixels output from the CDS/ADS unit 2406 is temporarily stored in temporary memory 2409 as recording digital image data (hereinafter referred to as recording image data), and output to an image processing circuit 2410. In the standby state for shooting, the digital image data for a through image (hereinafter referred to as through image data) thinly read from the CCD 2402 and output from the CDS/ADS unit 2406 is output directly to the image processing circuit 2410. The data is thinly read because the read can be performed in a shorter time than reading the signal of all pixels of the CCD 2402 and a smooth through image can be displayed, and the quality of the displayed image is not reduced on a thinly read image as the number of pixels to be displayed on a display unit 2414 is small relative to the number of all pixels of the CCD 2402. In the image processing circuit 2410, the following processes are performed and the results are output to each unit. Input recording image data is handled in the color converting process and γ process, and output to a compression unit 2411. Input recording or through image data is handled in the above-mentioned color converting process, the γ process, and the resizing process for display, and output to a display memory 2413. Furthermore, brightness data is extracted from the input recording or through image data, and output to a histogram processing unit 2415. The recording image data output from the image processing circuit 2410 is handled in the compressing process such as the JPEG compression, etc. by the compression unit 2411, and recorded in a recording unit 2412 such as Compact Flash (registered trademark), Smart Media (registered trademark), etc. The display memory 2413 temporarily stores the through image data and recording image data output from the above-mentioned image processing circuit 2410 to display them on the display unit 2414 comprising a monitor such as an LCD, etc. In the histogram processing unit 2415, a brightness distribution chart is generated based on the brightness data of each pixel of the through image data and recording image data generated by the image processing circuit 2410, and the generated brightness distribution chart is displayed on the display unit 2414. An operation unit 2416 allows a CPU 2417 to perform various processes in various key operations. At an instruction from the operation unit

2416, the CPU 2417 controls the setting of an iris by the iris setting unit 2403, the setting of an exposure time by the exposure time setting unit 2404, the setting of a gain by the gain setting unit 2405, deletion of shot image data in the recording unit 2412, the selection switch of the display contents by the display unit 2414, etc.

FIG. 25 shows an example of an operation flow in the standby state for shooting using a digital camera with the above-mentioned block configuration.

In the standby state for shooting in which a through image of a subject is displayed on the display unit 2414 of the digital camera (S2500), when an exposure time adjustment is made on the CCD 2402 based on the setting of the exposure time setting unit 2404 (S2502), the through image data of a subject retrieved from the CCD and handled in the thinning process based on the setting is read from the CDS/ADS unit 2406 (S2504). The through image data is handled in each of the color converting process, γ process, resizing process in the image processing circuit 2410, and the through image data generated in these processes is stored in the display memory 2413 (S2506). The brightness data is extracted in the image processing circuit 2410 from the through image data, the histogram processing unit 2415 generates a brightness distribution chart of the thinned image, for example, a histogram, etc. (S2508). The brightness distribution chart is overlaid on the through image and display on the display unit 2414 (S2510). The through image is compared with the brightness distribution chart displayed on the display unit 2414 (S2512), and it is determined whether or not the photographer has pressed a shutter button of the operation unit 2416 (S2512). If it is pressed, the shooting is performed. If it is not pressed, control is returned to step S2502, and a series of processes from an exposure to the display of a through image and a brightness distribution chart is repeated.

The value set in the exposure time setting unit 2404 in step S2502 can be set again in an operation performed by the operation unit 2416.

Figure 26:
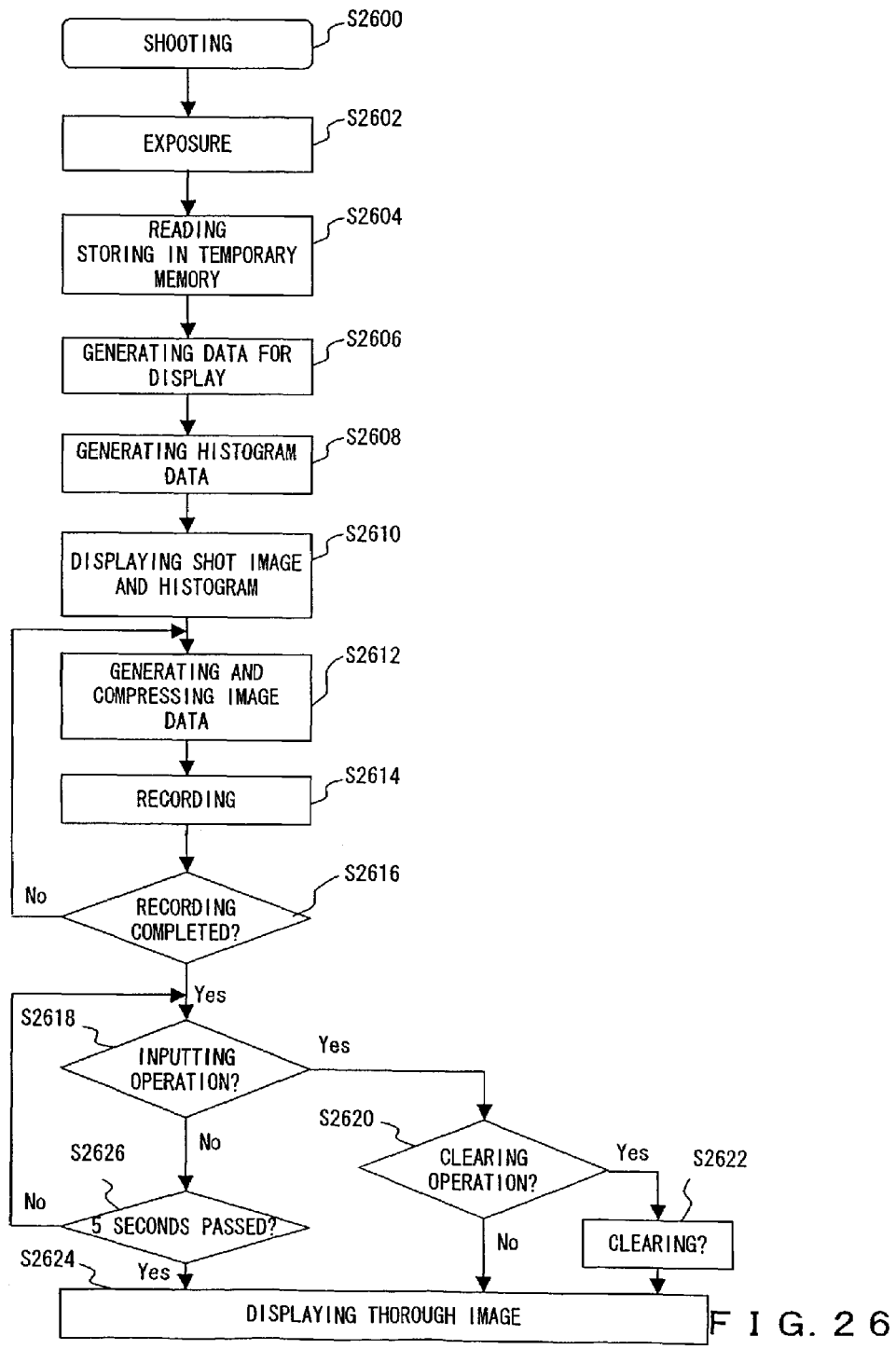

The operation flow in and after the shooting step shown in FIG. 25 is explained by referring to FIG. 26.

FIG. 26 shows an example of an operation flow of a digital camera when the display of a brightness distribution chart on the display unit 2414 is turned on at the shooting stage.

If a shoot instruction is issued by pressing a shutter button of the operation unit 2416 with the exposure determined in FIG. 25 (S2600), then an adjustment of the iris 2401 by the iris setting unit 2403, the CCD control by the exposure time setting unit 2404, the emission of the strobe 2407 is performed as necessary on a target subject, an exposure is performed for a predetermined time (S2602), signals of all pixels are read by the CCD 2402 after the completion of the exposure, the CDS/ADS unit 2406 performs a process, and the results are temporarily stored in the temporary memory 2409 (S2604). The temporarily stored recording image data is processed in a size converting operation, etc. by the image processing circuit 2410, and is temporarily stored as a recording image for display in the display memory 2413 (S2606). Furthermore, in the histogram processing unit 2415, a brightness distribution chart is generated based on the brightness data of the recording image data received from the image processing circuit 2410 (S2608). The brightness distribution chart generated according to the present embodiment is displayed with the brightness distribution of recording image data overlaid but distinguished from the brightness distribution of a predetermined area (for example, a metering area) on the screen in, for example, different colors, etc. The image based on the recording image for display temporarily stored in the display memory 2413 and the brightness distribution chart generated by the histogram processing unit 2415 is displayed on the display unit 2414 (S2610). The display method can be realized in various manners such as overlaying a recording image on a brightness distribution chart on the same display unit, separately displaying them on the same display unit, displaying them on the separate display units, etc. Furthermore, the recording image data is JPEG-compressed by the compression unit 2411 after an RGB conversion for each line in the image processing circuit 2410 (S2612), and is recorded as an image file in the recording unit 2412 (S2614). The processes in steps S2612 and S2614 are repeatedly performed until all image data is completely recorded (S2616). After the completion of the recording, if an operation input is received from the operation unit 2416 (S2618), and it is determined (S2620) that the operation is to specify the deletion of the recording image displayed on the display unit 2414 from the recording unit 2412, then the process of deleting the image file recorded in the recording unit is performed (S2622), and the display of the display unit 2414 is a through image (S2624). If no operation input is received for five seconds after the display in step S2610 of the recording image (S2626) after step S2616, or it is determined that the operation input received in step S2618 is not an operation of specifying the deletion of the image file currently displayed on the display unit 2414 from the recording unit 2412, then the display of the display unit 2414 is the display of a through image (S2624).

In this operation flow, after the recording image data is completely recorded in the recording unit 2412, an operation input is detected (S2618) and initiated, but the process can be interrupted (S2618) at any time point after the recording image and the brightness distribution chart are displayed on the display unit 2414 in step S2610. For example, when a deleting operation (S2620) is initiated while the RGB conversion and the JPEG compression (S2612) are in process and during recording by the recording unit 2412, the converting and compressing process and the recording process are stopped and an image file being written is deleted from the recording unit 2412 (S2622). If the deleting operation is not performed, the recording process in the recording unit 2412 is performed in the background, and the display contents of the display unit 2414 can be replaced with the display of a through image (S2624). In this case, if no operation input is received for five seconds after the display of the recording image and the brightness distribution chart in step S2610 on the display unit 2414 (S2626), the display on the display unit 2414 can be switched to display a through image while the corresponding image is being recorded in the recording unit 2412 (S2624) because the preparation for the subsequent shooting can be started.

Additionally, although the non-input time from the operation unit 2416 for switching the display of the display unit 2414 to the display of a through image after step S2616 is set initially to 5 seconds, the time can be adjusted appropriately.

Furthermore, the brightness distribution chart displayed on the display unit 2414 in step S2610 can be set not to be displayed, and the setting of the brightness distribution chart to be or not to be displayed can be performed in an operation from the operation unit 2416, at the time, for example, within a predetermined time immediately after the shooting in step S2600. If a brightness distribution chart is set to be displayed, the display unit 2414 can be set to display the recording image and the brightness distribution chart for an appropriately longer time than when it is set not to be displayed because it takes a long time to appropriately determine the applicability of the brightness distribution chart. Thus, since the display time is changed depending on the displayed contents, the photographer can make an appropriate determination. Furthermore, the process of compressing recording image data in step S2612 is explained in this example to be started after displaying an image and brightness distribution chart in step S2610, but it can be started simultaneously when the brightness distribution chart is generated in step S2608.

An example of the display unit of the digital camera in the standby state for shooting and during the display of a shot image according to the present embodiment is described below by referring to FIGS. 27 and 28.

Figure 27:
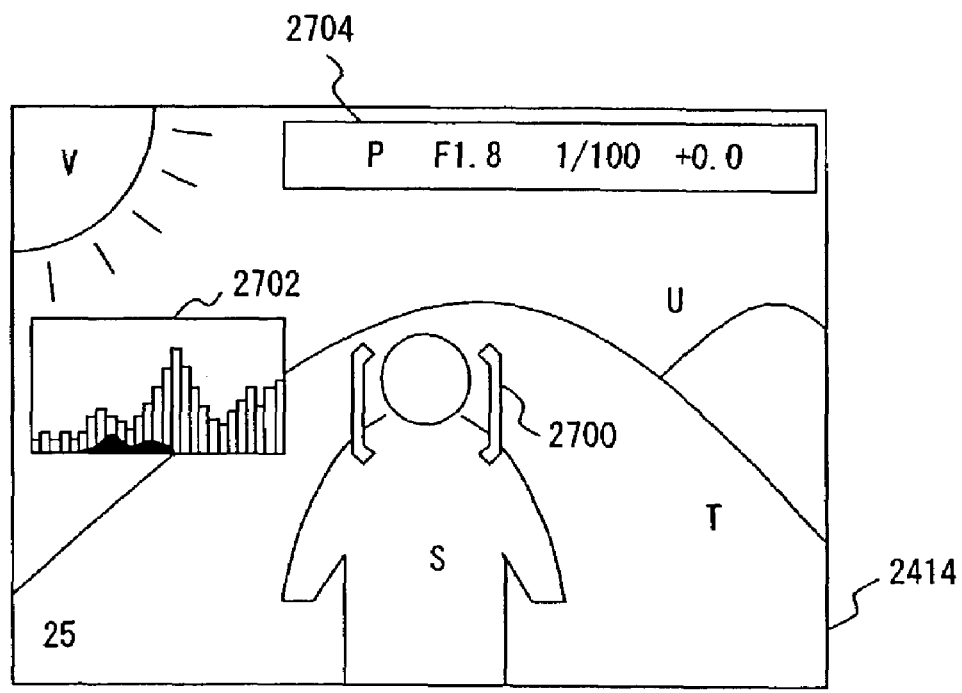
FIG. 27 shows an example of displaying through image data displayed on the digital camera shown in FIG. 24 in the standby state for shooting.

FIG. 27 shows an example of displaying a through image displayed on the display unit 2414 of the digital camera in the standby state for shooting. As shown in FIG. 27, the subject of the person S at the center with the mountain T, the sky U, and the sun V in the background is retrieved from the CCD 2402, and displayed as a through image on the display unit 2414. Displayed on the display unit 2414 by the display switch by the operation unit 2416 are: target marks 2700 at the center, a brightness distribution chart 2702 of a predetermined size to the left of the target marks, a set value 2704 of the current exposure condition above the target marks, that is, the exposure mode (P indicates the meaning of a program), the iris (F1.8), the shutter speed (1/100), and the exposure correction (+0.0), and the number (25) of images which can be currently shot at the lower left. In the brightness distribution chart 2702, the horizontal axis indicates a brightness value (for example, 8 bits can express 255 levels from 0), and the vertical axis indicates the brightness distribution expressed by the count value of the brightness value of a pixel. In the present embodiment, the brightness distribution is shown in the entire screen by a bar graph by outlined white bars on which a black area indicating the brightness distribution of the portion enclosed by the target marks is overlaid. Since the present embodiment aims at showing a thinly read through image, the brightness values appear more discontinuous than all the image pixels of whose image are read. In the standby state for shooting, the iris 2401 is fixed, the exposure time of the CCD 2402 is 1/30 seconds at maximum, and the strobe 2407 does not emit light. Therefore, as shown in this example, if the person S is in the back-light, the face of the person S enclosed by the target marks appears dark, and the brightness distribution within the target marks indicates lower brightness than the entire range.

FIG. 28 shows a recording image displayed on the display unit 2414 of the digital camera during shooting. As shown in FIG. 28, the same subject as shown in FIG. 27 showing the person S at the center with the mountain T, the sky U, and the sun V in the background is retrieved from the CCD 2402, and displayed on the display unit 2414 as a recording image. The display unit 2414 shows, by the display switch from the operation unit 2416, the target marks 2700 at the center, the brightness distribution chart 2702 of a predetermined size to the left of the target marks, and a clear enabled mark 2800 of the recording image currently displayed above. In the brightness distribution chart 2702, the brightness distribution indicated by the horizontal axis indicating the brightness value (for example, eight bits indicate 255 levels from 0) and the vertical axis indicating the count value of the brightness values of pixels as in the brightness distribution chart shown in FIG. 27. In the present embodiment, the brightness distribution is shown in the entire thin image by a bar graph by outlined white bars on which a black area indicating the brightness distribution of the portion enclosed by the target marks is overlaid. Since the present embodiment aims at displaying a recording image, the brightness values appear smoother than the through image as shown in the figure. During shooting, the iris 2401 is open, the exposure time of the CCD 2402 can be longer, and the strobe 2407 can emit light. Therefore, when the person S is in the back-light as in the present embodiment, the strobe light is emitted and the face of the person S within the target marks appears bright, and the brightness distribution within the target marks 2700 becomes appropriate relative to the entire range.

As described above, an example of the difference in display result between the standby state for shooting shown in FIG. 27 and the shooting state shown in FIG. 28. Depending on the shooting conditions, the image may not correspond to the brightness distribution displayed on the display unit between the standby state for shooting and the shooting state. Therefore, a desired image cannot be obtained, and the shooting process is required again.

Relating to the display layout of the above-mentioned brightness distribution chart, it is desired that the size, shape, and arrangement can be appropriately set, and the image displayed together with the brightness distribution chart has the size, shape, and arrangement such that it cannot be concealed.

Furthermore, the brightness distribution chart can be semitransparent and overlaid on the image data for display, and the brightness distribution chart can be displayed and concealed by a switch from the operation unit 2416 in an appropriate display method.

Additionally, since the brightness distribution of an entire image is to be apparently distinguished from the brightness distribution within the target marks 2700, an appropriate method of visually distinguishing them in different patterns as well as different colors can be used.

According to the present embodiment, a brightness distribution chart is displayed by a histogram configured by brightness values and count values for example, but can be displayed by a graph such as a pie chart, etc. depending on the situation.

Furthermore, a brightness distribution chart and an image can be independently displayed, or an exclusive display unit for displaying only a brightness distribution chart can be provided.

According to the present embodiment, the above-mentioned various brightness distribution charts are displayed on the digital camera. For example, the display can be applied to a still image, a moving picture on a video camera in the standby state for shooting and when shot image data is read to the display unit.

As described above, according to the present embodiment, since the recording image data and the brightness distribution charts of the recording image data are displayed for a predetermined time on the display unit 2414 during shooting, it can be easily determined whether or not a shot image is a desired image. When it is not a desired image, recording the image in the recording unit 2412 is immediately stopped, and the image recorded in the recording unit 2412 can be cleared.

Each of the above-mentioned operations of the digital camera according to an embodiment of the third aspect of the present invention can be realized by the CPU reading the control program relating to the contents of the operation from memory and executing it. Therefore, the control program, a storage medium storing the control program, or a program product can be included in the present invention. Therefore, the control program can be recorded in the memory built in the digital camera, the control program can be stored in the non-volatile memory built in a digital camera 2902 from a handy memory card 2900 such as a Smart Media (registered trademark), etc. as shown in FIG. 29, and the control program downloaded to the digital camera 2902 through a network 2904 can be stored in the non-volatile memory built in the digital camera 2902, thereby configuring a digital camera equivalent to the present invention.

As described above, according to the first aspect of the present invention, the relationship between the brightness distribution of an entire subject image and the brightness distribution of a predetermined range of the subject image can be clarified. Therefore, the photographer can correctly adjust the exposure condition, and the shooting can be performed under a desired exposure condition.

Furthermore, according to the second aspect of the present invention, the relationship between a brightness distribution chart and a metering value can be clarified. Therefore, the photographer can correctly perform an exposure correction based on the comparison between the brightness distribution chart and the metering value, and the shooting can be performed under a desired exposure condition.

Furthermore, according to the third aspect of the present invention, the photographer can check the details of a shot image immediately after the shooting, and it is determined whether or not a shot image is a desired image.

While the invention has been described with reference to the preferred embodiments thereof, various modifications and changes may be made to those skilled in the art without departing from the true spirit and scope of the invention as defined by the claims thereof.

What is claimed is:

1. An image pickup apparatus, comprising:
   an image pickup unit outputting an electronic subject image;
   a display unit displaying the subject image;
   an entire chart generation unit generating an entire brightness distribution chart which shows a brightness distribution of an entire range of the subject image;
   a partial chart generation unit generating a partial brightness distribution chart which shows the brightness distribution of a partial range of the subject image; and
   a control unit simultaneously controlling the entire brightness distribution chart and the partial brightness distribution chart on the display unit;
   wherein said control unit allows a predetermined display to be realized in a position inside or near the partial brightness distribution chart and corresponding to an average brightness value in a partial range of a subject image whose partial brightness distribution chart is to generated.

2. The apparatus according to claim 1, wherein
   said control unit controls the partial brightness distribution chart to be overlaid on the entire brightness distribution chart in a corresponding position and displayed on said display unit.

3. The apparatus according to claim 1, wherein
   said partial chart generation unit generates a partial brightness distribution chart based on a metering range for determination of an exposure condition specified for the subject image displayed on said display unit.

4. The apparatus according to claim 3, further comprising a change unit changing the metering range, wherein
   said partial chart generation unit generates a partial brightness distribution chart depending on a metering range after the change.

5. The apparatus according to claim 1, wherein
   said partial chart generation unit generates a partial brightness distribution chart based on s focusing range for detection of focus.

6. The apparatus according to claim 1, further comprising a partial range setting unit setting a partial range in which the partial brightness distribution chart is generated.

7. A method of displaying a brightness distribution chart, comprising:
   generating an entire brightness distribution chart indicating a brightness distribution of an entire range of an electronically picked up subject image, and a partial brightness distribution chart indicating a brightness distribution of a partial range of the subject image;
   overlaying the partial brightness distribution chart on the entire brightness distribution chart it in a corresponding position and displaying the two brightness distribution charts on a display; and
   allowing a predetermined display to be realized in a position inside or near the partial brightness distribution chart and corresponding to an average brightness value in a partial range of a subject image whose partial brightness distribution chart is to be generated.

8. A computer-readable medium having stored thereon a computer program comprising a set of instructions when executed by a computer to implement a method for allowing a display unit to display an electronic subject image, the method comprising the steps of:
   generating an entire brightness distribution chart indicating a brightness distribution of an entire range of the subject image;
   generating a partial brightness distribution chart indicating a brightness distribution of a partial range of the subject image; end
   controlling the display unit to display the partial brightness distribution chart and the entire brightness distribution chart by overlaying the partial brightness distribution chart over the entire brightness distribution chart in a corresponding position; and
   allowing a predetermined display to be realized in a position inside or near the partial brightness distribution chart and corresponding to an average brightness value in a partial range of a subject image whose partial brightness distribution chart is to be generated.

9. An image pickup apparatus, comprising
   an image pickup unit outputting an electronic shot image;
   a metering unit computing a metering value from the shot image;
   a brightness distribution chart generation unit generating a distribution chart of brightness values from the shot image; and
   a display unit displaying the brightness distribution chart, wherein
   said display unit displays a metering values obtained by metering a plurality of points by said metering unit near a brightness value of the brightness distribution chart corresponding to the metering value, and in places of respective corresponding brightness values.

10. The apparatus according to claim 9, wherein:
    said display unit comprises a display control unit for controlling as to whether or not the metering value is to be displayed;

when the metering value is not to be displayed, said brightness distribution chart generation unit generates an axis relating to a brightness value of the brightness distribution chart as a linear axis.

11. The apparatus according to claim 9, wherein said display unit displays an axis for display of a metering value along an axis relating to a brightness value of the brightness distribution chart, and displays a plurality of metering values corresponding to the axis for display of the metering value.

12. The apparatus according to claim 9, wherein said brightness distribution chart generation unit comprises a conversion unit for canceling the tone converting process on a shot image handled in a tone converting process.

13. A method for displaying a brightness distribution chart, comprising:
generating a brightness distribution chart obtained by representing a brightness axis as a logarithm based on a shot image output from an image pickup unit;
computing a metering value obtained by metering a plurality of points from the shot image; and
displaying the metering value obtained by metering a plurality of points, together with the generated brightness distribution chart, near a brightness value of the brightness distribution chart corresponding to the metering value, and in places of respective corresponding brightness values.

14. An image pickup apparatus, comprising:
an image pickup unit outputting image data for recording or image data for a through image;
a brightness distribution chart generation unit generating a brightness distribution chart based on the output image data; and
a shot image check unit displaying an image based on the output image data and the brightness distribution chart on a display unit; and
an instruction unit determining whether or not to remove the brightness distribution chart from the display immediately after the shooting, wherein
said shot image check unit displays a brightness distribution chart generated based on the image data for recording only for a predetermined time immediately after shooting; and
when the instruction to remove the brightness distribution chart from the display immediately after the shooting is issued, said shot image check unit displays only the image for a period shorter than the predetermined time as compared with a case in which an image and a brightness distribution chart are displayed.

15. The apparatus according to claim 14, wherein said shot image check unit stops the display in the predetermined time when a predetermined operation is performed.

16. The apparatus according to claim 14, wherein image data for the through image is configured by a number of pixels smaller than image data for recording.

* * * * *